United States Patent [19]

Kourtides et al.

[11] Patent Number: 5,038,693
[45] Date of Patent: Aug. 13, 1991

[54] COMPOSITE FLEXIBLE BLANKET INSULATION

[75] Inventors: Demetrius A. Kourtides, Gilroy; William C. Pitts; Howard E. Goldstein, both of Saratoga; Paul M. Sawko, San Jose, all of Calif.

[73] Assignee: The United States of America as represented by the Administrator of the National Aeronautics and Space Administration, Washington, D.C.

[21] Appl. No.: 410,576

[22] Filed: Sep. 21, 1989

[51] Int. Cl.$^5$ .................................................. B32B 7/08
[52] U.S. Cl. ...................................... 112/440; 428/285
[58] Field of Search .................. 112/420, 440; 428/285

[56] References Cited

U.S. PATENT DOCUMENTS

| | | | |
|---|---|---|---|
| 3,007,596 | 11/1961 | Matsch | 220/9 |
| 3,018,016 | 1/1962 | Hnilicka | 220/10 |
| 3,152,003 | 10/1964 | Exchaquet | 117/62.2 |
| 3,274,788 | 9/1966 | Hoffman | 62/45 |
| 4,401,707 | 8/1983 | Bailey | 428/285 |
| 4,844,960 | 7/1989 | Spriggs | 428/285 |
| 4,919,995 | 4/1990 | Joly | 428/285 |

OTHER PUBLICATIONS

AIAA Paper #82-0630-CP "Improved Thermal Protection System for the Space Shuttle Orbitor" H. Goldstein, D. Leiser, P. Sawko, H. Larson, May 10-12, 1982.
AIAA Paper #89-1772 "Ceramic Insulations Multifoil Composite for Thermal Protection of Re-Entry Spacecraft" W. Pitts & D. A. Kourtides, Jun. 12-14, 1989.
FireSciences vol. 16 "High Temperature Properties of Ceramic Fibers & Insulations for Thermal Protection of Atmospheric Entry & Hypersonic Cruise Vehicles" D. Kourtides, W. Pitts, M. Arayo, R. Zimmerman, Sep.-/Oct. 1988.
"Composite Multilayer Insulations for Thermal Insulation" D. A. Kourtides, W. C. Pitts, Clemson U. 3rd Annual Conference on Protective Clothing, May 23-25, 1989.
"Fibrous Ceramic Insulation" H. E. Goldstein, NASA AIAA Adv. Materials Technical Conference, Nov. 16-17, 1982.
"Thermomechanical Properties of SiC Yarn" A. S. Fareed, Ping Fang, M. J. Koczak & F. M. Ko, Ceramic Bulletin, vol. 66, #2, 1987.
"Standard Methods of Testing Sewing Threads" ASTM Designation: D204-82.
"Development of a Silicon Carbide Sewing Thread" P. Sawko, Anand Vasudev, SAMPE Quarterly, vol. 20, No. 4, Jul. 1989.
"Strength and Flexibility Properties of Advanced Ceramic Fabrics", P. Sawko & Huy Kim Tran, SAMPE Quarterly, vol. 17, No, 1, Oct. 1985.
"Effect of Processing Treatments on Strength of Silica Thread for Quilted Ceramic Insulation on Space Shuttle" P. Sawko, SAMPE Quarterly, vol. 16, #4, Jul. '85.
"Influence of Thread Construction on Strength of Ceramic Sewing Threads" P. Sawko & Huy Kim Tran, SAMPE Quarterly, vol. 18, #4, NASA Conference Pub. 3001.
Fiber-Tex 1987, "Tailorable Advanced Blanket Insulation" (TABI), P. Sawko, Nov. 3-6, 1987.
NASA Contractor Report #907 (Oct., 1967) "Performance of Multilayer Insulation Systems for Temperatures to 700° K." George R. Cunningham, Jr., Carl A. Zierman, Arnold I. Funaf and Alfred Lindham.
NASA Tech Brief Article, Jan. 1979, "The Effects of Power and Temperature Overstress" #MFS-25249.
"Reflecting Layers Reduce Weight of Insulation", Winter 1980, *NASA Tech Brief*, p. 505.

Primary Examiner—Werner H. Schroeder
Assistant Examiner—Diana L. Biefeld
Attorney, Agent, or Firm—Darrell G. Brekke; Harold W. Adama; John R. Manning

[57] ABSTRACT

Composite flexible multilayer insulation systems (MLI) were evaluated for thermal performance and compared with currently used fibrous silica (baseline) insulation system. The systems described are multilayer insulations consisting of alternating layers of metal foil and scrim ceramic cloth or vacuum metallized polymeric films quilted together using ceramic thread. A silicon carbide thread for use in the quilting and the method of making it are also described. These systems are useful to provide lightweight thermal insulation for a variety of uses, particularly on the surface of aerospace vehicles subject to very high temperatures during flight.

11 Claims, 23 Drawing Sheets

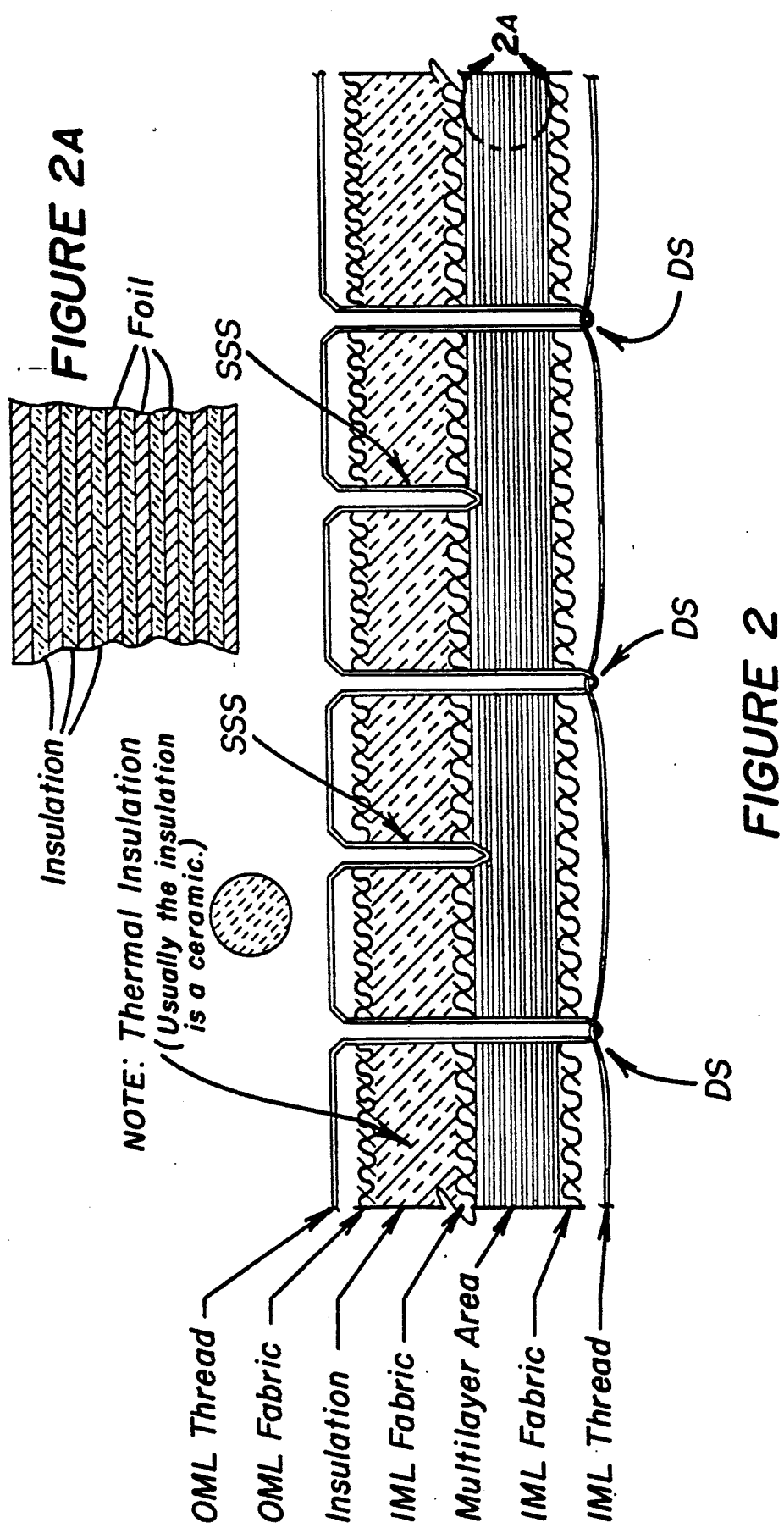

MULTILAYER INSULATION
MLI

VARIED MULTILAYER INSULATION
VMLI

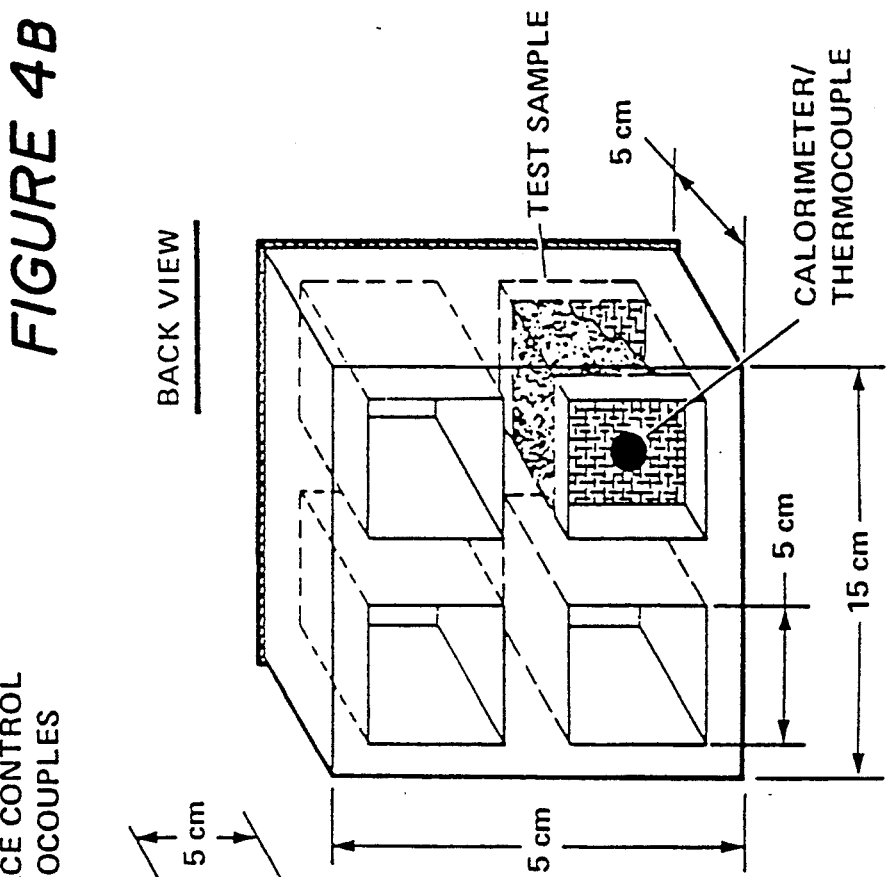
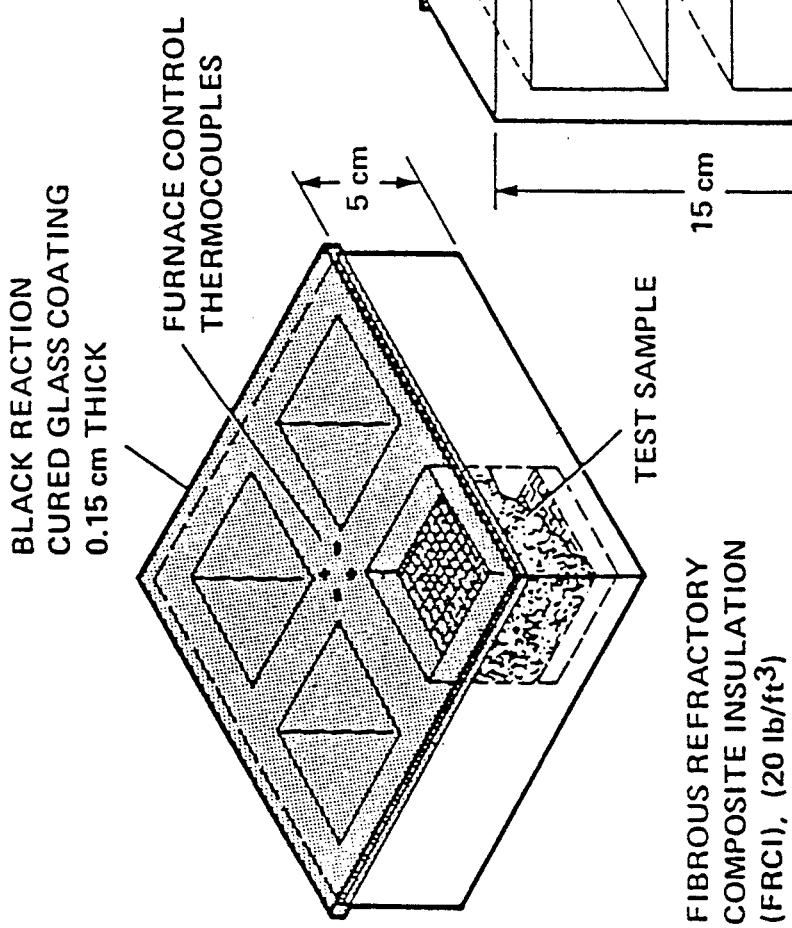
FIGURE 4A
FIGURE 4B

COMPOSITE FLEXIBLE BLANKET INSULATION

BACKGROUND OF THE INVENTION

Origin of the Invention

The invention disclosed herein was made in the performance of work under a NASA contract and is subject to Public Law 96-517 (35 U.S.C. §200, et seq.). The contractor has not elected to retain title to this invention.

Field of the Invention

The present invention relates to a composite flexible blanket insulation (CFBI) comprising multiple alternating thin layers of aluminum foil and spacers, a thick layer of ceramic fiber insulation and outer and inner layers of fabrics quilted together using ceramic thread having a high emissivity and resistance to a high heat flux. The blanket has thermal insulation capability for up to 1300° C. The CFBI has the potential to significantly reduce vehicle structural temperatures for a fixed insulation thickness or alternatively to allow the use of thinner blankets with a corresponding reduction in heat shield or thermal protection system weight. The CFBI has an effective lower thermal conductivity and lower thermal diffussivity than state-of-the-art insulations, and thus is able to protect attached substructures from reaching a critical temperature at a minimum weight and/or thickness.

BACKGROUND OF THE INVENTION

A prime consideration in the thermal protection of subjects exposed to extremely high temperatures, such as for example, aerospace vehicles or firemen's suits and tools, is the requirement for highly efficient lightweight thermal insulations. Aerospace vehicles, in particular, are subject to aeroconvective and radiative heating, launch acoustics and rain during atmospheric entry and consequently require extremely efficient thermal protection systems capable of protecting the metal or composite substructures from reaching temperatures above their operating limit.

Even though existing silica fibrous insulations, such as the Space Shuttle Orbiter's Advanced Flexible Reusable Surface Insulation (AFRSI), provide an excellent thermal protection for large portions of the Orbiter, as reported previously in *AIAA;* 82-0630 (May 1982) or *Ceramic Eng. Sci. Proc.*, 6:793 (1985), there is a need to develop more efficient lightweight high temperature flexible insulations.

AFRSI is a quilt-like material made of two layers of silica and glass cloth with one layer of fibrous silica felt between them. The quilt is sewn together with silica and glass threads and has thickness between 1-5 cm. It has a temperature capability in excess of 650° C. The AFRSI external cover is a silica fabric. A fiberglass is used on the internal surface which is then bonded to the shuttle skin with silicone adhesive. The AFRSI quilt is treated with a silane water repellant so that it will remain waterproof prior to launch. It has a density of approximately 9-10 lb/ft$^3$, depending on its thickness.

This type of insulation evolved into another insulation called Tailorable Advanced Blanket Insulation (TABI), which is described in *NASA CP*:3001: 135-152 (Nov., 1987). TABI has a higher temperature capability and greater tolerance to aerodynamic loads than AFRSI. Although these insulations are progressively more durable, they all have comparable thermal conductivities of the order of $5 \times 10^{-2}$ W/meter·° Kelvin (m·K) at room temperature at pressure of 0.01 atmosphere. It does not seem likely that this value could be reduced significantly with conventional materials. Thus, the main disadvantage of the prior art is its limitation to possess lower thermal conductivity which may be a critical factor for aerospace vehicles exposed to high aeroconvective thermal environments and which require a lightweight insulation.

However, certain improvement has been achieved with multilayer insulation (MLI) blanket, which has a much lower thermal conductivity. This MLI blanket is commonly used for thermal control within spacecraft. When the MLI blanket is combined with an all ceramic fibrous insulation such as the AFRSI or TABI, much lower effective thermal conductivities can be achieved.

A very lightweight MLI has commonly been used for spacecraft thermal control. For example, in 1982, *NASA C.P.*, 2229:101-111 (May 1982), described a passive design for the thermal control of the Galileo Entry Probe. The design utilized radio-isotope heater units, multilayer insulation (MLI) blankets and a thermal radiator. The MLI blanket had 2 mm thick VDA Kapton ® inner and outer layers and 11 layers of Dacron mesh alternated with 10 layers of 0.006 mm VDA Mylar ®, all these layers being electrostatically grounded to local conductive shield. The MLI's function for the Galileo probe was essentially to provide a low temperature insulation with primary aim to maintain certain temperature within the probe rather than having to function as insulator against outside heat.

A significant advance in thermal insulation for cryogenic applications was the development of multilayer insulation technology described previously in *Advances in Cryogenic Engineering*, 5:209 (1959), Plenum Press, and *AFFDL* TR-68-75 (April 1968). Cryogenic insulation technology is an important consideration for hypervelocity cruise vehicles which involve long-term propellant storage requirements. However, this type of insulation has been studied primarily at lower temperatures, and relatively little data and little practical experience have been reported for insulations in the temperature range of 900° C. to 1100° C.

It would, therefore, be advantageous to have available an insulation having a temperature capability of AFRSI around and above 1000° C. and the lightweight of MLI which would be suitable for repeated use at these temperatures.

Recently, an insulation was developed which combined AFRSI and MLI into a single blanket. These multilayer insulations operating from 500° C. to 1000° C. temperatures were described in *J. Fire Sci.*, 6:313 (1988). The insulations described consisted of ceramic aluminoborosilicate fabrics used for top and bottom surfaces; silica, aluminoborosilicate (ABS) or alumina insulations, and multilayers of stainless steel foils separated by ABS scrim, all quilted together using ceramic thread. The multi-layer configurations were made up of multiple stainless steel foil radiation shields layers separated by ABS scrim cloth layers. Fibrous ceramic insulation was laid on top of the multifoil configuration and the whole assembly was quilted in a lightweight ABS fabric and sewn with ABS thread.

While this type of insulation seems to be adequate and suitable for insulation at temperatures up to 800° C., the oxidation of stainless steel occurring after multiple heating and cooling cycles effect negatively the spectral reflectance, and therefore made this insulation quite impractical for use in situations where the durability for repeated use at high temperatures is of importance.

Thus, it would be advantageous to have available a lightweight insulation having the thermal insulating capability for up to 2000° C. suitable to be subjected to repeated heating and cooling.

From the above description of problems connected with design and fabrication of the insulation blankets suitable for high temperature insulations, the importance of the thread used for quilting of the blanket is apparent.

As pointed out above, AFRSI quilted ceramic blankets functioning as part of the thermal protection system (TPS) for the Space Shuttle Orbiter vehicle is an assembly of ceramic materials consisting of a fibrous silica batting sandwiched between a silica fabric and a glass fabric, sewn together in a 2.54 cm by 2.54 cm stitch pattern with a polytetrafluoroethylene (PTFE) sized silica thread. Since AFRSI provides thermal protection in temperatures only up to 650° C., the thermal design requirements for advanced spacecraft exceed the temperature limits of the silica-type AFRSI used. For example, the Aeroassisted Space Transfer Vehicle (ASTV) will produce temperatures greater than 650° C. as a result of an aeromaneuvering technique used to reenter low Earth orbit and the National Aerospace Plane (NASP) is also expected to generate high temperatures, in some cases above 1100° C., as a result of hypersonic flight speeds.

Thus, there is a need for other ceramic materials suitable to be used at higher temperatures than 750° C. As one of these materials, the high temperature resistant threads are very desirable for fabrication of these ceramic insulation blankets.

Previous studies described in *NASA C.P.*, 3001:135–152 (1988) have shown that silicon carbide (SiC) fabric surfaces can survive higher heating loads than silica fabric. For example, exposure to a heating rate of 37 W/cm$^2$ resulted in no observable deterioration of the SiC fabric surface, whereas a silica fabric became brittle after exposure to 10 W/cm$^2$. The higher emissivity of SiC over silica was found to be another advantage for high-temperature environments.

Thus, a high-temperature sewing thread of SiC yarn would be very desirable. This SiC thread would have to possess the capability of being machine-sewn into a quilted blanket using a construction process similar to that used for AFRSI. The outer mold line (OML) fabric and OML sewing thread used would be made of SiC instead of silica.

It is, therefore, an object of this invention to provide a lightweight, durable, flexible, reusable blanket-like multilayer insulation quilted with high temperature-resistant threads, such as SiC, zirconia, silicon nitride, TYRANNO FIBER ® (composed of silicon-titanium-carbon-oxygen derived from organometallic precuror), and the like, which have the thermal insulation capability well above until now used insulations for use in the spacecraft industry, for furnace curtains, fire tools and equipment or for any other use where the temperature capability, the insulation efficiency and weight are all important.

Advantages of such insulation are partially described in *AIAA*-89-paper 1772 (June 1989) and in paper entitled "Composite Multilayer Insulations for Thermal Insulation," presented at Clemson University's Third Annual Conference on Protective Clothing on May 23–25, 1989. Development of SiC sewing thread is described in *SAMPE Quart.*, 3–8 (1989).

The U.S. Pat. Nos. 3,007,596, 3,018,016, 3,152,003 and 3,274,788 are of general interest:

All of the references, patents, articles, standards, etc., cited herein are expressly incorporated by reference.

SUMMARY OF THE INVENTION

One aspect of this invention is to provide a highly efficient insulation that provides a spacecraft thermal protection system that is significantly lighter in weight than systems using state of the art insulations.

Another aspect of this invention is to provide a lightweight composite, multilayered, flexible, durable, reusable multilayer blanket insulation comprising top and bottom fabric layers, insulation layer and multilayer area made of reflecting radiation shield layers of aluminized polyimide film or any other metallic film on a polymeric substrate or metal foil alternating with aluminoboro-silicate scrim, felt or polyimide film or other suitable spacer sewn together into a quilted blanket with high temperature withstanding ceramic thread.

Another aspect of this invention is an insulation blanket having a thermal insulating capability for temperatures up to 2000° C. on the hot exterior surface wherein the surface density is significantly smaller than those of other state of the art insulations.

Yet another aspect of this invention is the insulation blanket made of multiple layers of aluminum foil or composed vacuum deposited aluminum on polyimide film sheets, separated from each other by aluminoborosilicate scrim cloth, aluminoborosilicate felt or polyimide, covered with silica or aluminoborosilicate insulation and sandwiched between outer surface (top) and inner backface (bottom) fabrics, all of the above sewn together by using a high temperature silicon carbide sewing thread.

Yet another aspect of this invention is the insulation blanket having between about 9 and 30 layers of composite vacuum deposited aluminum layers alternating with polyimide film layers covered with silica felt insulation having both outer and inner fabric made of aluminoborosilicate, the blanket having a total thickness no more than 2.5 cm and total average density of no more than 0.13 g/cm$^3$, has thermal insulation capability between 1000° C. to about 2000° C., and is sewn together with the high temperature resistant thread.

The final aspect of this invention is a design, preparation and manufacture of silicon carbide sewing thread thin and durable enough to be suitable for sewing fabrics for high-temperature applications, which sewing thread withstands heat fluxes up to 37 W/cm$^2$ without breakage, kinking, doubling or twisting.

BRIEF DESCRIPTION OF THE DRAWINGS

FIG. 2A is a side cross-sectional view of the multilayered insulation blanket.

FIG. 2B is an enlarged cut out portion of the insulation of FIG. 2A, showing the alternating layers of metal foil and ceramic insulation.

FIG. 4 is a thermal diffusity sample holder from view (4A) and back view (4B) with test sample in position.

DETAILED DESCRIPTIONS OF THE INVENTION

Definitions

Figure 1A:
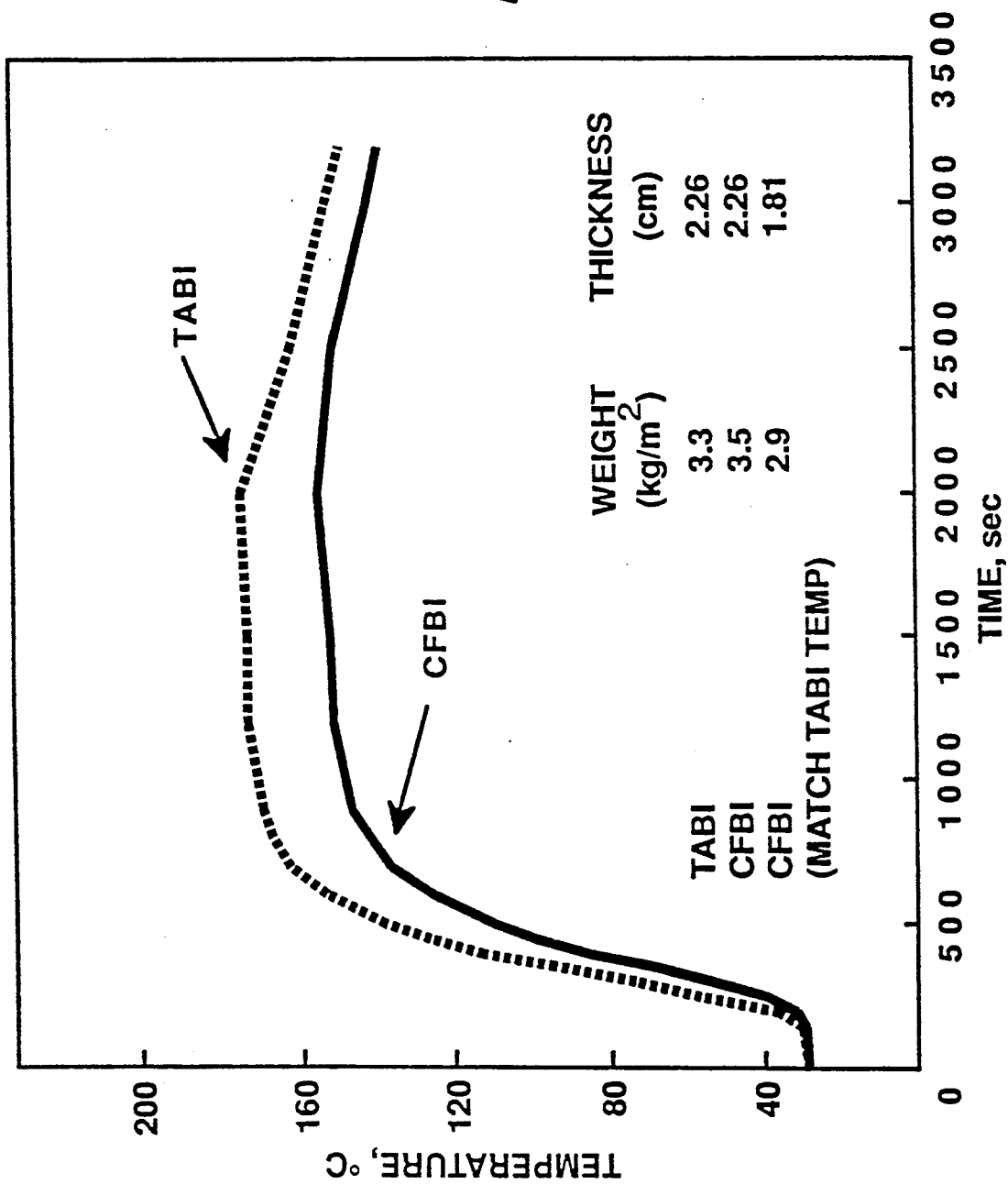
FIG. 1A depicts a comparison of thermal response to TABI and CFBI blankets.

As used herein:

"Denier" refers to the number of grams per 9000 m, using a direct yarn numbering system expressing yarn number in terms of mass per unit length.

"Filament" refers to a variety of fiber having an extreme length which are not readily measured.

"Thread" refers to a flexible small diameter yarn or strand, usually treated with a surface coating, lubricant or both used to stitch one or more pieces of material.

"Tow" refers to a twistless multi-filament strand suitable for conversion into staple fibers or sliver, or for direct spinning into yarn.

"Yarn" refers to a continuous strand of textile fibers, filaments or materials in a form suitable for knitting, weaving, or otherwise intertwining to form a textile fabric.

The definitions described in "Standard Methods of Testing Sewing Threads ASTM D204," Vol. 07.01, American Society of Testing Materials (1983) are specifically incorporated herein by reference.

I. THE DESIGN, PREPARATION AND MANUFACTURE OF COMPOSITE FLEXIBLE BLANKET INSULATION

The composite flexible blanket insulation of the current invention provides an improved lightweight insulation which is extremely effective in terms of thermal protection of structures subjected singly or repeatedly to high heat fluxes. The present insulation utilizes the previously known MLI concept in conjunction with high temperature flexible ceramic insulations to derive a lightweight insulation configuration effective at high temperatures and at near vacuum conditions. The insulation is made of lightweight materials quilted together into an insulation blanket with durable silicon carbide or other high temperature withstanding ceramic threads. Optimum foil insulation configuration, optimal combination of MLI with insulation, improved thermal insulation capability, significant lightweight, novel process for fabrication of the blanket, and thin, durable silicon carbide thread are primary features of this invention.

Three different types of reflective shields were evaluated with various types of ceramic insulations. The first included stainless steel foils separated by aluminoborosilicate (ABS) scrim cloth. The insulations used in this multilayer system included either silica, ABS, or alumina felt. The second used aluminum foils in two different geometries. The foils were separated either by an ABS scrim cloth or by the insulation. In the last configuration, an aluminized polyimide film was used as the reflective shield. Aluminized polyimide film may be substituted with any high temperature organic film having similar thermal and weight properties, such as, for example, gold or platinum deposited on film. High temperature organic films include, for example, KEVLAR®, TEDLAR® (polyvinyl fluoride), KAPTON®, available from DuPont, Wilmington, Del., or PEEK (polyetherether ketone) from Imperial Chemical Industries, Petrochemical and Plastics Division, Welwyn Garden City, United Kingdom. The metal deposition is accomplished by procedures such as chemical vapor deposition (CVD), which are conventional in the art. The metal deposited high temperature film is usually available by special order from the film manufacturer. The thickness of the metal layer needs to be uniform to cover the plastic film. Usually, it is between about 100 and 3000 microns, preferably between 1000 and 2000 microns, especially about 200 microns in thickness. The films were placed on the bottom of a silica insulation. All configurations contained an ABS cloth on the top and bottom of the entire insulation.

A description of various composite insulations that have been tested is shown in Table 1. Alternatively, even more lightweight configurations are possible. Some of these configurations are described in Table 4.

TABLE 1
DESCRIPTION OF COMPOSITE INSULATIONS
FLEXIBLE COMPOSITE BLANKET INSULATION CONFIGURATION

| COMPOSITE INSULATION COMPONENTS | 1 | 2 | 3 | 4 | 5 | 6 | 7 | 8 | 9 |
| --- | --- | --- | --- | --- | --- | --- | --- | --- | --- |
| Top/Bottom Fabric | Silica | Silica | ABS | ABS | ABS | ABS | ABS | ABS | ABS |
| Insulation Type | Silica felt | Silica felt | ABS | Silica mat | Silica felt | Silica felt | ABS | ABS | Silica felt |
| Spacer | None | None | ABS Scrim | ABS Scrim | ABS Scrim | Silica Scrim | ABS Scrim | ABS felt | Polyimide |
| Reflective Shield | None | None | S.S. | S.S. | Aluminum | Aluminum | Aluminum | Aluminum | CVD Aluminum |
| Thickness cm | 1.0 | 2.4 | 1.0 | 1.0 | 2.4 | 2.5 | 2.4 | 2.5 | 2.4 |
| Density g/cm$^3$ | 0.21 | 0.13 | 0.28 | 0.28 | 0.17 | 0.14 | 0.16 | 0.14 | 0.13 |

The most important feature of this invention is the lightweight of the composite flexible blanket insulation (CFBI) which provides for substantial weight saving.

This potential in weight savings is exemplified in FIG. 1A, whereby equal aluminum substructure temperature is achieved between the CFBI and another blanket called Tailorable Advanced Blanket Insulation (TABI), with the CFBI having lower weight and thickness.

FIG. 1A compares thermal response of CFBI with TABI. Whereas TABI, which has a higher weight of 3.3 kg/m$^2$ for blanket of 2.26 cm thickness was only able to protect an insulated substructure up to about 170° C., CFBI of the same weight and thickness as TABI protected the substructure from overheating over about 150° C. Moreover, the CFBI of much lower (2.9 kg/m$^2$) weight and substantially reduced thickness of 1.81 cm. achieved essentially the same results as heavier and thicker TABI, i.e., it successfully insulated substructures from reaching temperatures over about 170° C. Thus, the lightweight, thinner CFBI of this insulation has better insulation properties than heavier and thicker TABI.

The other important features of this invention are the thermoinsulating capability which is described below, and an adequate strength retention of various materials such as silica, silica mat, silica felt, silica scrim, ABS, ABS felt, ABS scrim, SiC or other sewing threads and yarns used in fabrication of CFBI.

It is therefore important that the ceramic fibers and yarns, such as silica, ABS, silicon carbide and the like used to prepare the CFBI structures have adequate strength retention after various stages of handling, weaving, and assembly into CFBI blanket *SAMPE Quart.*, 17:7-13 (1985) discusses the strength and flexibility behavior of these yarns in fabric form. The ability of these yarns to survive the dynamic forces of weaving and fabrication is fundamental to the successful application of all new and known insulations for any advanced space vehicle.

Figure 1B:
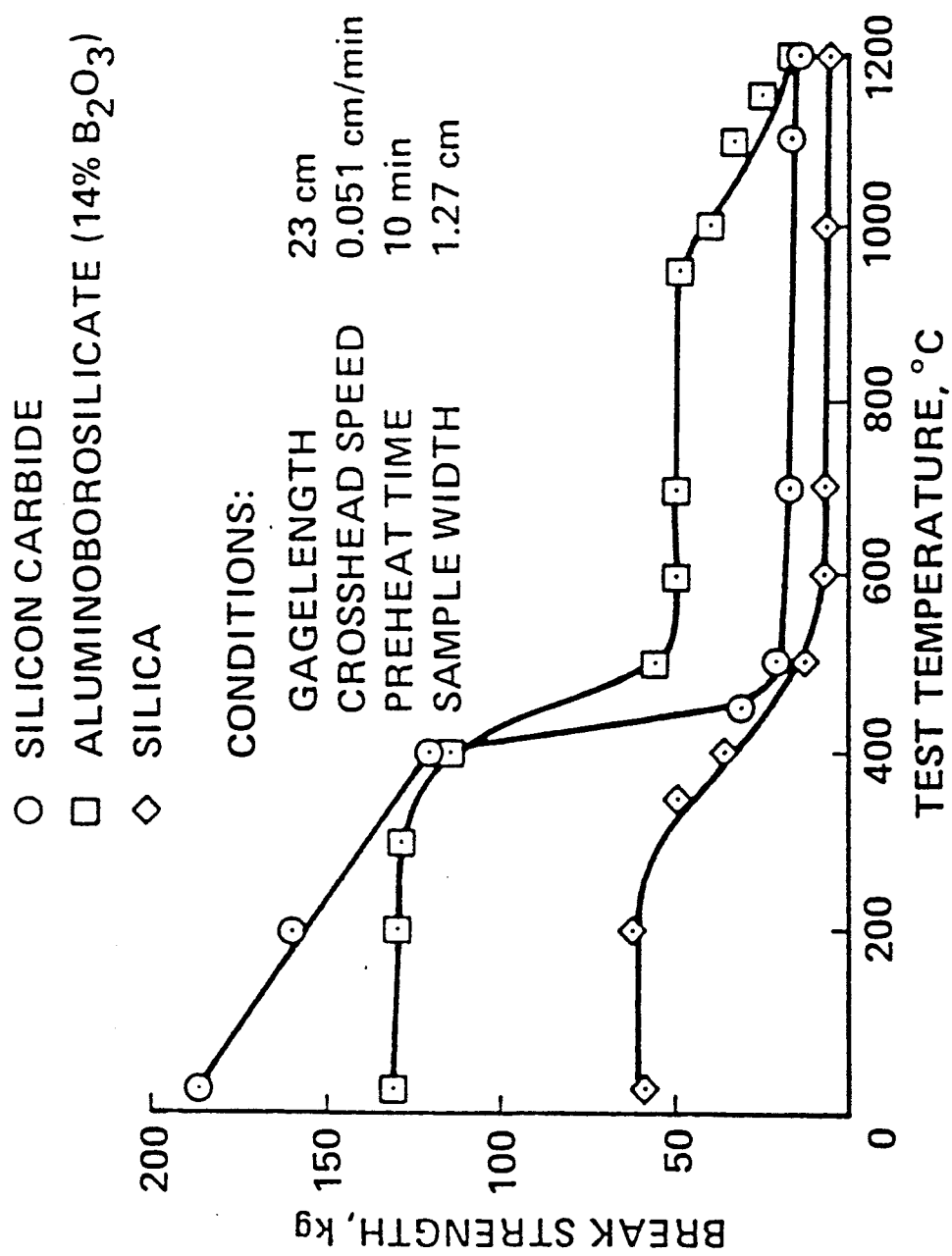
FIG. 1B depicts a comparison of the break strength of ceramic fabrics.

FIG. 1B shows the effect of temperature on the strength of silica, ABS and silicon carbide fabrics tested in the warp direction. Break strength measurements at temperatures up to 1200° C. were obtained to determine the fabric strength. All the fabrics were evaluated with the organic finish that has been applied during yarn processing. The silicon carbide fabric had the highest initial break strength of the three fabrics used. It not only loses strength between room temperature and 400° C., but also has the largest strength loss between 400° C. and 600° C. owing to removal of the finish. The 14% boria content ABS has lower strength at room temperature and loses about 60% of its starting strength between 400° C. and 600° C. because of removal of the finish. The silica fabric had the lowest strength at 1200° C. which could represent a high-temperature service condition and it is expected that SiC in particular would retain its property even at higher temperatures.

All known ceramic yarns may be successfully woven into integrally woven core structures, but with different degrees of weaving difficulty. Unless prepared by the novel process for fabrication of SiC thread of this invention, which is equally applicable for fabrics, yarns and threads used as multilayer spacers, insulation, surface fabrics or sewing threads of this invention, silicon carbide is the most difficult to weave, followed by the 14% Boria content ABS. Silica is the least susceptible to yarn breakage during weaving. This is probably related in part of the differences in tensile modulus and fiber diameter. Silicon carbide has the highest modulus and largest fiber diameter, ABS is intermediate, and silica has the lower modulus and small fiber diameter.

Performance of ceramic fabrics in a convective heating environment is another important feature of successful high-temperature insulations. The high-temperature performance of ceramic fabrics used to prepare CFBI for advanced space vehicles was evaluated and described in *NASA*, CP3001:135-152 (Nov. 1987). The results are summarized in Table 2. Three ceramic fabrics—silica, aluminoboro-silicate, and silicon carbide—were used as the cover fabrics with a fibrous silica batting layered between to form a blanket-like insulation. The thermal performance of these constructions was measured in the NASA-Ames Research Center's 20-MW Panel Test Arc Jet Facility in a stagnation point-convective heating environment representative of an AOTV atmospheric entry condition at Moffett Field, California. For these tests, the maximum power used was 5.8 MW. The fabric temperature was considered the hardest test parameter to measure. Both thermocouple and optical pyrometer measurements were taken to obtain fabric temperatures. Since both techniques are uncertain, the heating rate rather than surface temperature provides a more reliable measure of the thermal environments. Table 2 summarizes the fabric convective heating rate limits for the three ceramic fabrics tested along with some qualitative assessment of post-test fabric condition. The silica fabric showed little change at 4 BTU/ft$^2$-sec, but was stiff at 6 BTU/ft$^2$-sec and brittle at 9 BTU/ft$^2$-sec. The ABS fabric cover did not stiffen until 12 BTU/ft$^2$-sec, but embrittled at 15

BTU/ft²-sec. The silicon carbide fabric survived a heating rate of 34 BTU/ft²-sec without degradation although some discoloration was observed.

TABLE 2

| FABRIC MATERIAL | CONDITION AFTER EXPOSURE TO INDICATED HEATING RATE, BTU/ft²-sec | | |
|---|---|---|---|
| | Little Change | Stiff | Brittle |
| Silica | 4* | 6* | 9* |
| ABS | 9** | 12** | 15** |
| Silicon Carbide | 34** | — | — |

*Calculated based on observed temperature performance.
**Measured Re-radiation

Performance of ceramic fabrics in a convective heating environment.

Still another important feature for both the fibers and sewing threads used for CFBI fabrication is the emittance of the surface fabric and the sewing thread since the performance of a CFBI during reentry into the atmosphere is affected by the emittance of the surface fabric.

The higher the emittance, the better insulation capability and/or better thermal performance of the fiber. Any fiber which has higher emittance functions at higher heat flux which allows it to operate and perform at lower temperatures.

When three fibers, ABS, silica used in AFRSI, and silicon carbide were compared for their hemispherical emittance, the silicon carbide fabric had a total hemispherical emittance higher (between 0.55–0.70) at temperature of around 1090° C., compared to emittance of about 0.46 for ABS and 0.43 for silica. At 1538° C. (2800° F.), SiC has an emittance still around 0.45 to 0.52, while both ABS and silica have much lower emittance of about 0.35 or 0.36 respectively. At room temperature, all three fabrics have emittances above 0.8.

There are available other fibers such as zirconia felt, known under the tradename ZIRCAR ® which retains its fibrous nature to 2480° C., and its flexibility to around 1370° C., ceramic fibers based on organometallic polymers known as TYRANNO FIBER ®, yielding a composition of silicon, titanium, carbon and oxygen, maintaining fiber strength at 1300° C. Silicon nitride maintains high fiber strength after conditioning for 2 hrs at 1200° C. Its typical bulk composition by weight is 59% silicon, 29% nitrogen, 10% carbon, 2% oxygen. It is fully amorphous and it has nominal density 2.5 g/cm³.

All these and other fibers which can withstand high heat flux without changing thermal properties and which possess other properties such as break-strength, are lightweight and can be used as sewing thread are contemplated to be within the scope of this invention.

Variations of layers of the composite insulation blanket are shown in FIG. 2A and 2B. The most upper outside facing hot surface layer, described here as outer mold line (OML) fabric is generally made of aluminoborosilicate fabric which is suitable for insulation purposes for up to 1000–1100° C. For high heating rates, the top fabric may be replaced with silicon carbide fabric. It is to be understood that all fabric materials possessing required properties would be equally suitable to be used for the outer layer.

Under the outer layer, the insulation layer is positioned. The thickness of the insulation layer is between 0.3 to 4 cm or more and would depend on the total thickness requirement of the blanket. The material used for insulation may be a silica felt, aluminoboro-silicate, a silica mat, alumina or any other suitable material meeting requirements for high temperature insulation.

Referring to Table 1 in order to assess the effectiveness of different types of insulations, composites 3–9 were fabricated with four different types of insulations. Composite insulations 5 and 6 contained a silica felt similar to the baseline AFRSI insulations with an average fiber diameter of 1.5 microns. The fibers were randomly oriented in the silica felt. Composite insulation 4 contained a silica mat with an average fiber diameter of 5 microns. The fibers were oriented more in a planar configuration than in a random configuration. Insulation 3 contained an ABS (62% Al₂O₃, 24% SiO₂, 14% B₂O₃) mat with an average fiber diameter of 3.5 microns. Composites 5–9 utilized either silica or ABS insulation with the aluminum foil separated either by the scrim cloth or by the insulation itself.

The most preferred configuration of Table 1, composite 9, contained silica felt insulation with chemically vacuum deposited (CVD) aluminum on polyimide film separated by either another layer of polyimide film or simply by positioning the CVD aluminum in such a manner that CVD aluminum always faces the back of the previous CVD aluminum polyimide film sheet, said back thus forming the natural insulation barrier between two consecutive CVD aluminum layers.

As a radiation shield material, insulations 3–4 had stainless steel foils and insulations 5–8 had aluminum foil. The foils were separated by spacers made of the aluminoboro-silicate (ABS) scrim cloth in insulations 3–5, and 7, and with the insulation itself in 6 and 8. The purpose of the scrim cloth was to eliminate heat shorts between adjacent foils.

The multilayer component (MLI) depicted in FIG. 2A is situated under the insulation and is optionally separated from it by a thin layer of the inner mold line fabric which is essentially the same as OML fabric described above. It is to be understood that OML and IML may be the same or different materials as long as they meet the general high temperature endurance requirement. MLI insulation is described in detail in FIGS. 2A and 2B.

Under the MLI insulation the IML fabric is situated. This layer is attached to a structure to be insulated with, for example, silicone adhesive, mechanical fasteners or by any other suitable means able to withstand temperatures up to 425° C.

Figure 17:
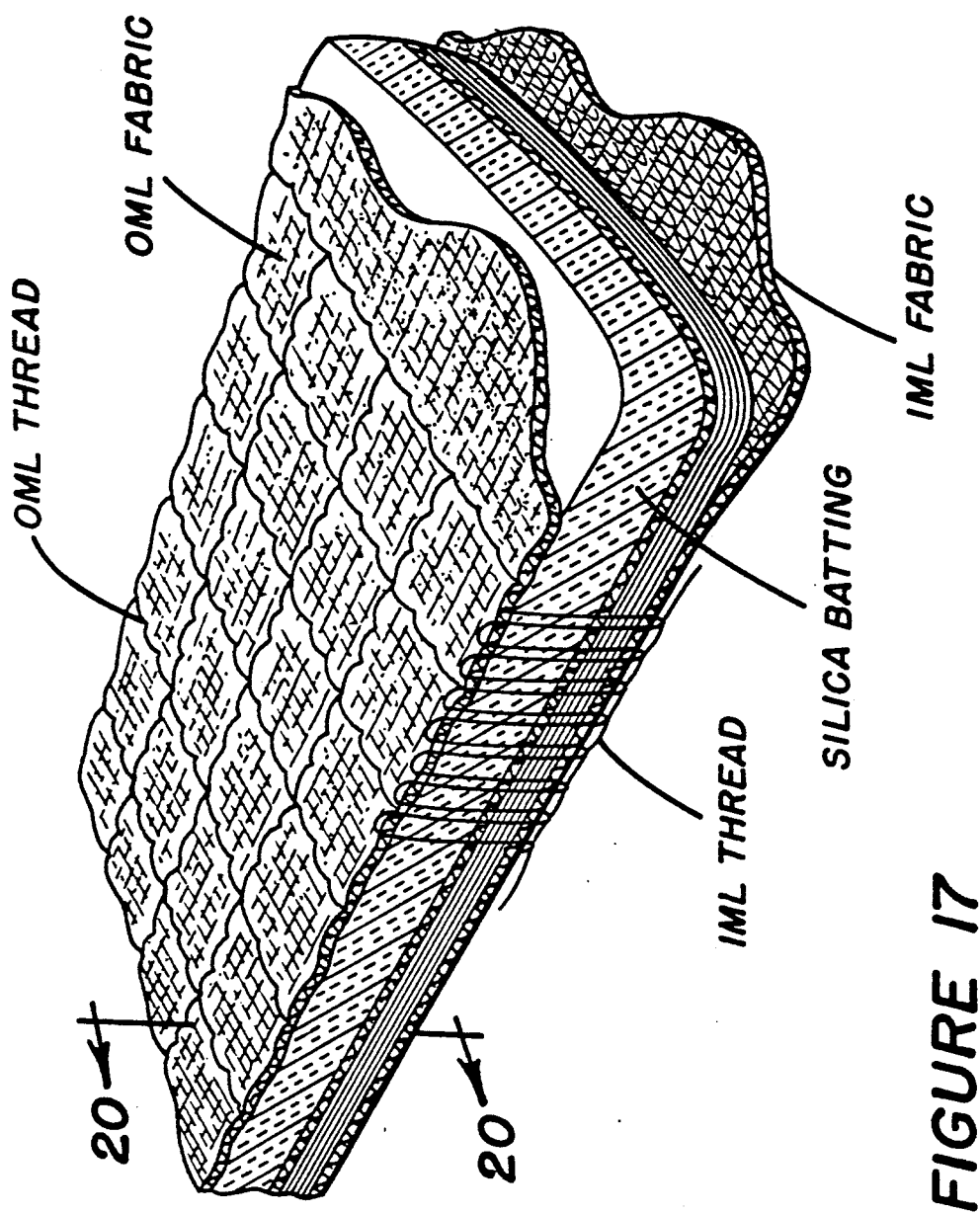
FIG. 17 shows sewn blanket construction.

To fabricate CFBI, all above described layers are laid on wood frame, as described in Example 3 and quilted together using a ceramic thread such as PTFE-sized silica, aluminoborosilicate, zirconia, TYRANNO FIBER ®, silicon nitride, preferably silicon carbide thread for temperatures up to 1200° C., TYRANNO FIBER ® for temperatures up to 1400° C., and zirconia for temperatures up to about 2000° C., in some cases made by the procedure described below. There are two threads, OML thread and IML thread, used for quilting. OML thread is of the same thickness or slightly thicker than IML thread (not shown in FIG. 2). The thickness of the thread is between 0.010–0.090 cm, preferably 0.051 cm. OML thread is sewn through all blanket layers in 2.5 cm by 2.5 cm square fashion as shown in FIG. 2A, wherein in order to provide a maximum quilting with minimum damage to insulation layers, the deep stitches, depicted as DS, go through all layers of the blanket and are interlaced with IML thread using the modified stitch type 301, according to FED-STD-571a, said modification being that the IML thread would not be pulled midway into the layers as required by 751a regulation but will be only superficially embedded in the blanket's IML fabric. Shallow superficial stitches (SSS) go only through the blanket insulation layer but not through the MLI area so that the damage to metal (aluminum) foils is as small as practically possible. The square manner of the stitching is better visible on FIG. 17 then alternates the DS with SSS (not shown in either FIG. 2 or 17) so that 2 opposite corners of the 2.5 cm by 2.5 cm square are always either DS or SSS. While the square sewing pattern is the most preferable one, all other patterns which meet the requirements of the smallest possible damage to the blanket layers are contemplated to be within the scope of this invention. The edges of the blanket are made according to procedures described in Example 3 below. Typical configurations of the current invention are listed in Table 3. Many more configurations are possible using, for example, light-weight organic thermally stable fabrics such as polybenz-imidazole and other lightweight fibers used on the IML surface. This will result in even lighter configurations as those shown in Table 3 below.

Figure 3A:
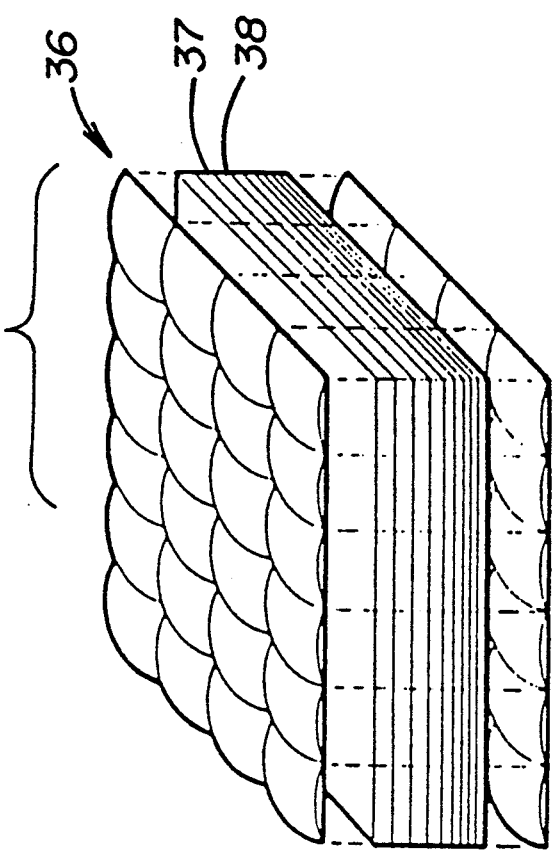
FIG. 3 is a configuration of multilayer (3A) and variable multilayer (3B) composite insulations.
Figure 3B:
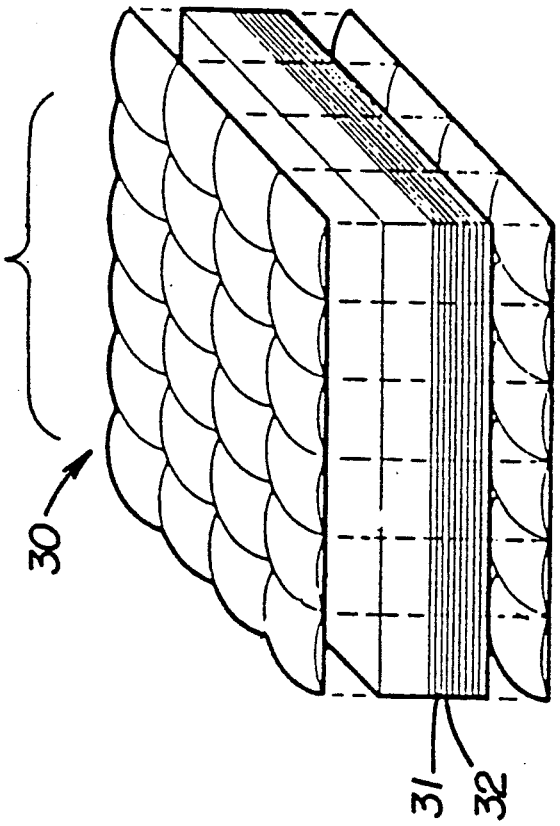

FIGS. 3A and 3B compare the MLI insulations 3, 4, 5, 7 and 9 and variable multilayers (VMLI) composite insulations 6 and 8.

The multilayer insulation (MLI) 30 shown on the left used metal foils 31 separated by the scrim cloth 32, with 9 alternating layers shown in this figure while in the variable multilayer insulation (VMLI) 36 shown on the right, the foils 37 were separated by the insulation 38 and no scrim cloth is used. There may be 5–30 alternating layers, with 9 alternating layers being preferred. Composite insulation 9 contained 20 plies of aluminized polyimide (Kapton ®) or gold CVD film as the radiation shield material. The film was composed of 700 Å of vacuum deposited aluminum on 0.0012 cm thick polyimide film. The use of this film eliminated the need for an additional ceramic scrim material. In the composite insulations the metal foils 37 act as the radiation shield in the multilayer assembly and must maintain their optical properties at high temperatures.

Composites 5 and 7 had the scrim cloth separating the foils while variable multilayer insulations (VMLI) 6 and 8 had the foil separated by the insulation itself. All insulations were heat cleaned at 454° C. in air for 2 hours to remove any sizing or organic coating from the fibers. Insulations 1 (1.0 cm thick) and 2 (2.4 cm thick) were both AFRSI.

Upon introduction of the metal layers into these composite multilayer blankets, the problem of weight attached to such use of metal foils arose. For example, the use of stainless steel foil in configurations 3-4 resulted in approximately 35-39% weight increase over the AFRSI at equivalent thickness, while the use of the aluminum foil in configurations 5-8 resulted only in 24% weight increase over the AFRSI at equivalent thickness. When the scrim cloth was eliminated, as in VMLI configurations 6 and 8, there was no weight penalty, as there was no weight penalty in configuration 9.

Since the use of stainless steel foil or the 0.0025 cm aluminum thick foil would not be suitable because of their weight the other foil materials were used as shown in configurations 6, 8 and 9.

All of the above configurations contained from 9-30 layers of the foil with 9-30 layers of the scrim cloth. Configuration 9 contained 20 layers of aluminized polyimide film resulting in an equal overall density as the AFRSI insulation 1 and 2. The density is expressed in $g/cm^3$.

As pointed out, the stainless foils tend to quickly oxidize during repeated heating and cooling, which fact combined with the weight, makes it quite unsuitable for use on structures which are repeatedly subjected to high temperatures.

The preferred configuration 9, using the aluminized film has been already shown to have equal density as the AFRSI and could be made lighter depending on the number of films and spacers utilized. Further, it has been already shown that CFBI can be made thinner hence lighter than AFRSI or TABI for the same performance. In terms of oxidative degradation, the additional advantage is added, since there is much smaller oxidative degradation in configuration 9 than in configurations 3 and 4.

Figure 6:
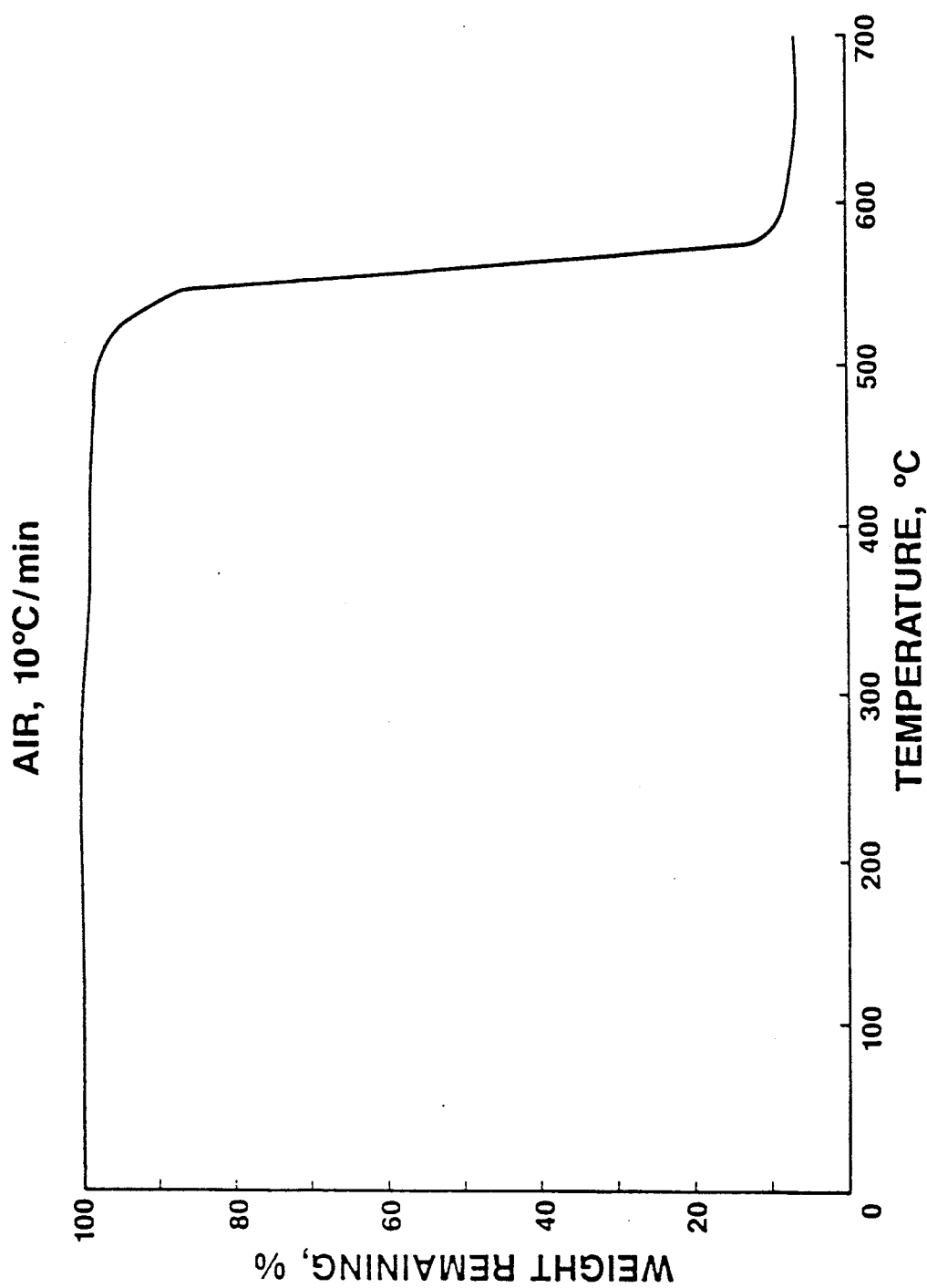
FIG. 6 depicts a thermogravimetric analysis of the aluminized film.

The thermogravimetric analysis of the aluminized film is shown in FIG. 6. Weight % remaining in the blanket at various temperatures is constant 100% until up to 500° C. Then, the oxidative degradation of the film is initiated.

The main advantage of the use of the aluminized film is the weight savings. The film weighs approximately 18 $g/m^2$. The thinnest aluminum foil commercially available is 0.00076 cm thick and weights 20 $g/m^2$. When combined with a thin ceramic scrim cloth, the total weight is 46 $g/m^2$.

Figure 5:
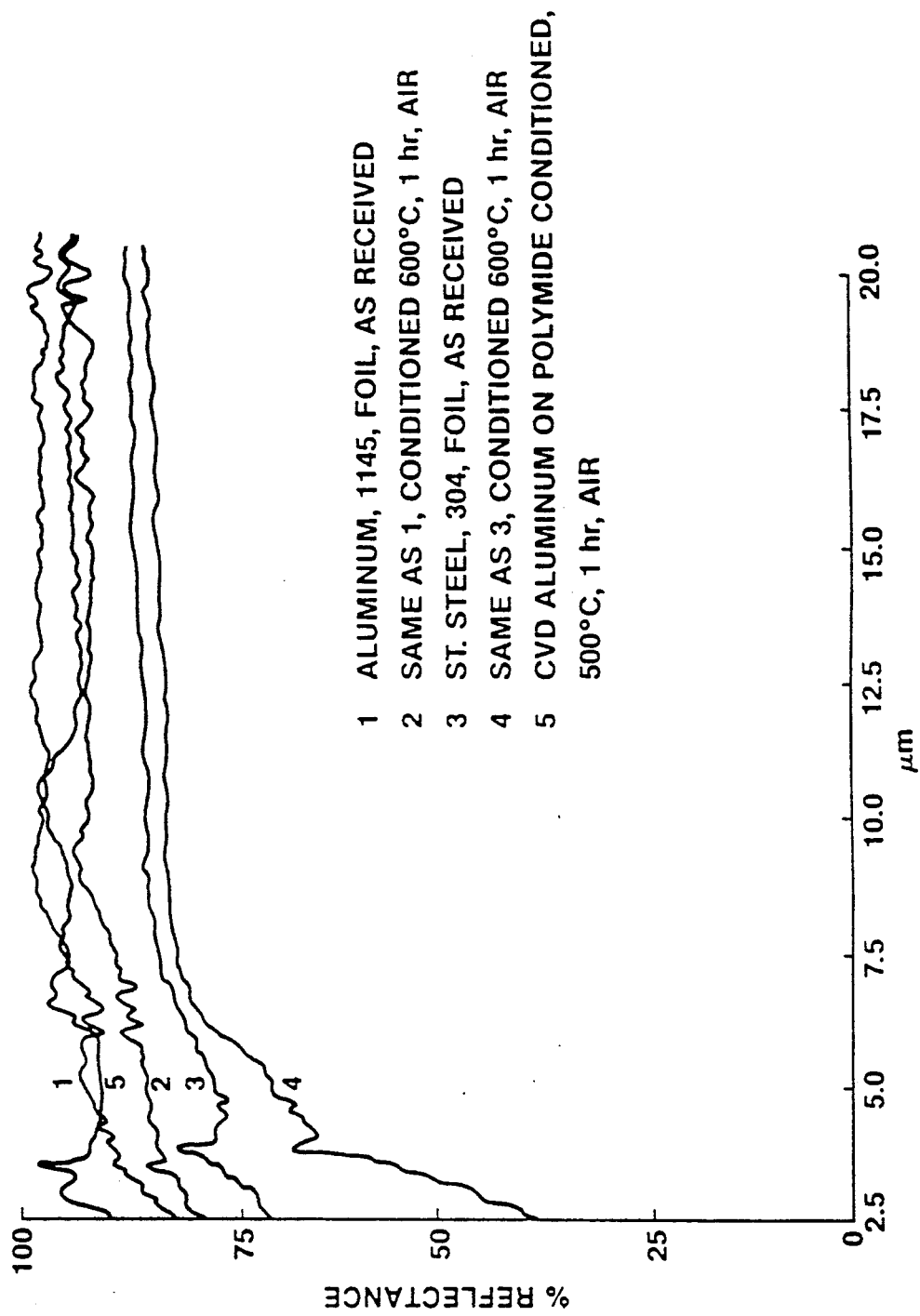
FIG. 5 depicts reflectance of stainless steel foil, aluminum foil, CVD aluminum on polyimide film before and after heating in air.

The insulation performance is a function of the metallized film infrared reflectance. Infrared reflectance measurements were performed on the foils and the aluminized film over the wave length region of 2.5 to 20.0 micrometers. The spectral reflectance of the foils and aluminized film is shown in FIG. 5. As can be seen, the stainless steel configurations (3 and 4) have the lower reflectance than the aluminum both before and after heating. There was only a small reduction in the reflectance of the aluminum foil after heating and this reduction was fairly uniform throughout the wavelength range tested. The aluminized polyimide film, after heating at 500° C. in air, had approximately the same reflectance as the non-heated aluminum foil, thus clearly illustrating the excellent thermal capability of the preferred embodiment 9.

The spectral reflectance of the aluminum as a foil or chemically vapor deposited aluminum on polyimide film does not degrade significantly as a function of temperature. The high reflectance of these films make them attractive as radiation shields.

The insulation thermal diffussivity or thermal response is generally measured by the increase in backface temperature as a function of time. The backface temperature means the temperature measured in the IML fabric after exposure of the outer surface (OML) to high temperature, in this instance to temperatures between 1000° C. and 2000° C.

The thermal response of the composite insulations was determined using a procedure and apparatus described previously in *NASA Tech. Brief* 10642 (Jan. 1979). The pressure used in the apparatus for testing configurations 1-8 (Table 1) was 20 mm Hg. The equipment was subsequently modified to test at a pressure of 1.5 mm Hg which simulates the vacuum environment of the various aerospace vehicles. Configuration 9 of Table 1 was tested at this lower pressure with AFRSI configuration 2. The temperature pulse applied to the front surface was between 1000° C. and 1300° C. The backface temperature was measured for 20 minutes.

The test results are the average of eight test runs from each configuration. Two thermocouples were used to determine the top temperatures: one embedded in a reaction cured glass (RCG) coating on the top (FIG. 4A) of the sample holder shown in FIGS. 4A and 4B; and the second uncoated thermocouple located below the top fabric of the insulation, FIG. 3B.

Figure 7:
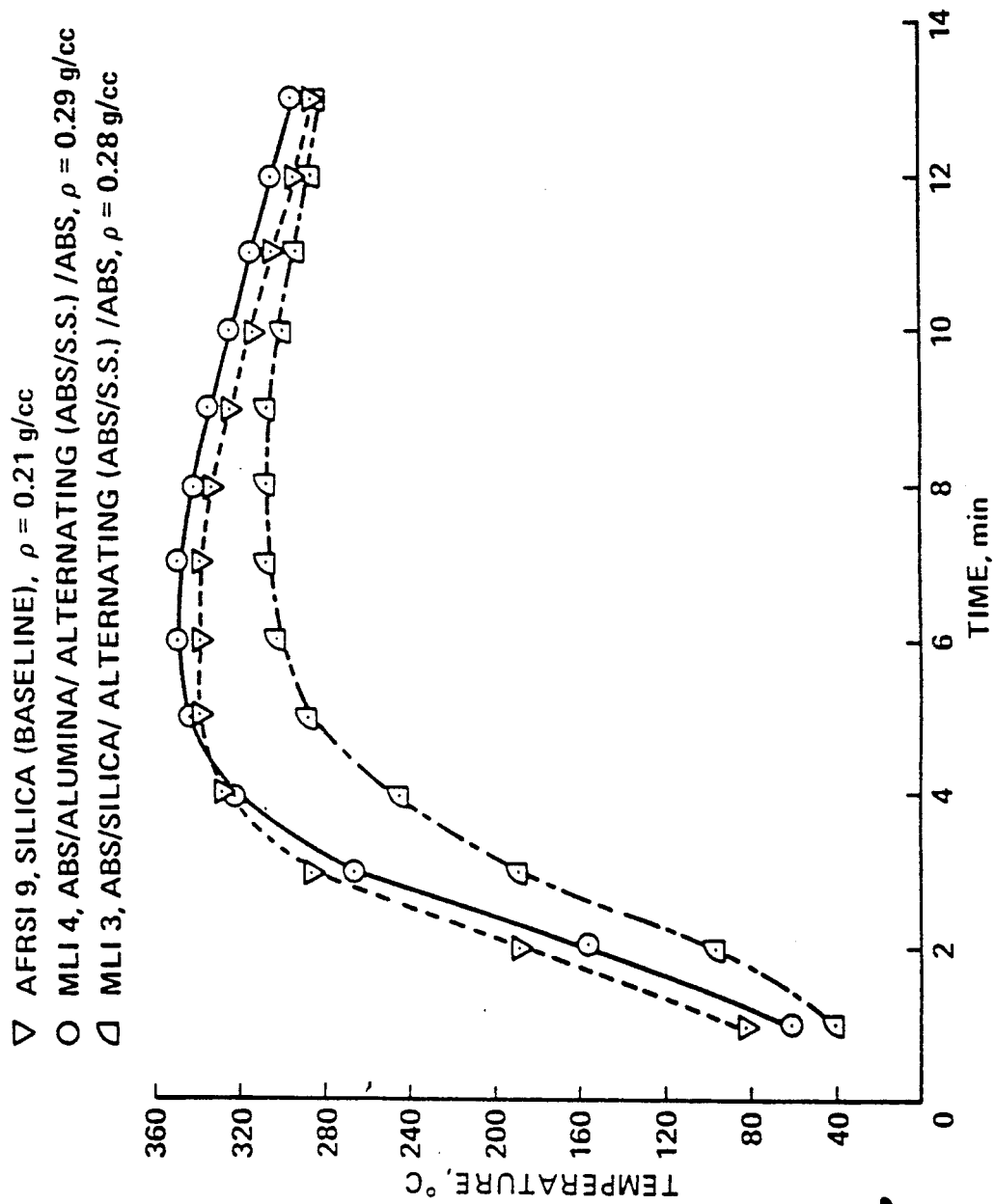
FIG. 7 depicts a comparison of thermal response of stainless steel—silica mat or alumina multilayer insulations with silica insulation.

FIGS. 7 through 11 show the test results using this apparatus. FIG. 7 shows 1.0 cm thick composite insulation 3 with stainless steel foil compared to the AFRSI insulations 1 of equivalent thickness. FIG. 6 shows that composite insulation comprising MLI of alternating ABS and stainless steel with the alumina insulation had a backface temperature similar to the AFRSI 1. This insulation had the highest backface temperature of all the MLI insulations tested probably attributed to its higher thermal conductivity. Composite insulation 4 contained the silica mat with the 5 micron diameter fibers. This insulation reached a maximum backface temperature of 315° C. This is attributed to the higher diameter of the fiber.

Figure 8:
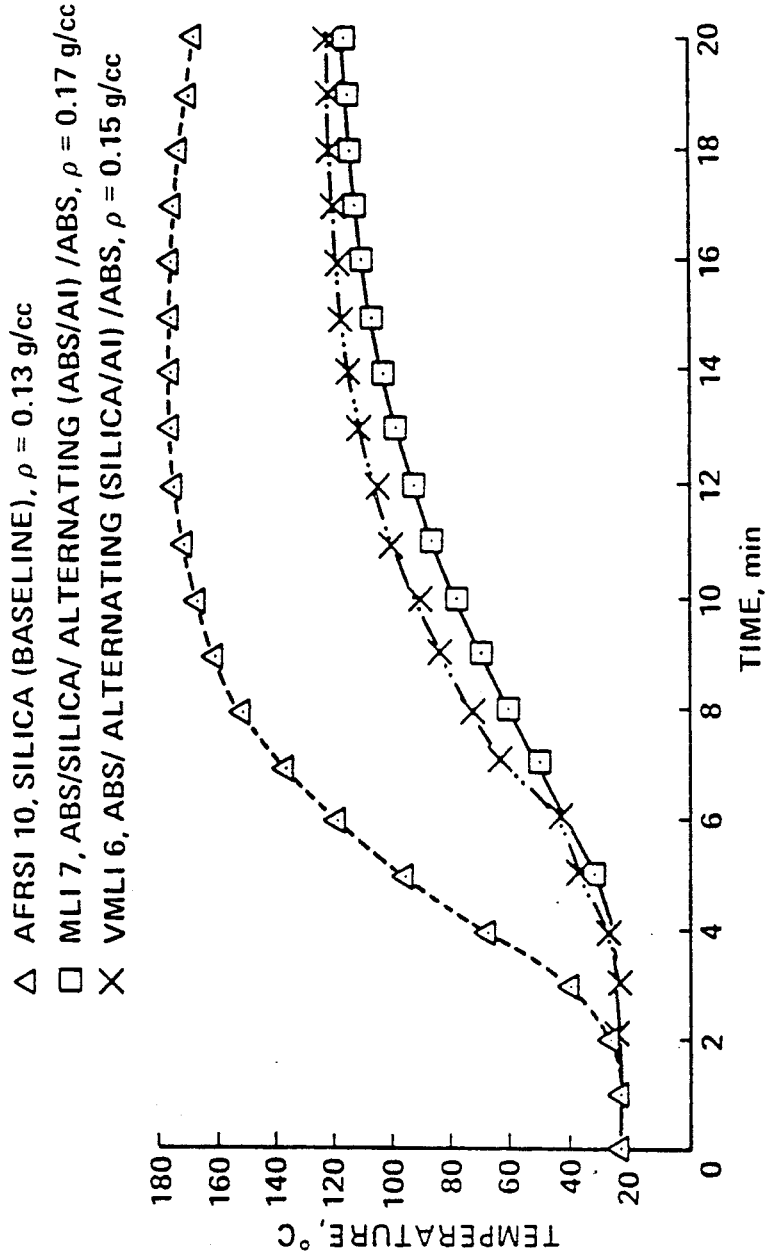
FIG. 8 depicts a comparison of thermal response of aluminum—silica felt multilayer or variable MLI insulations with silica insulation.
Figure 9:
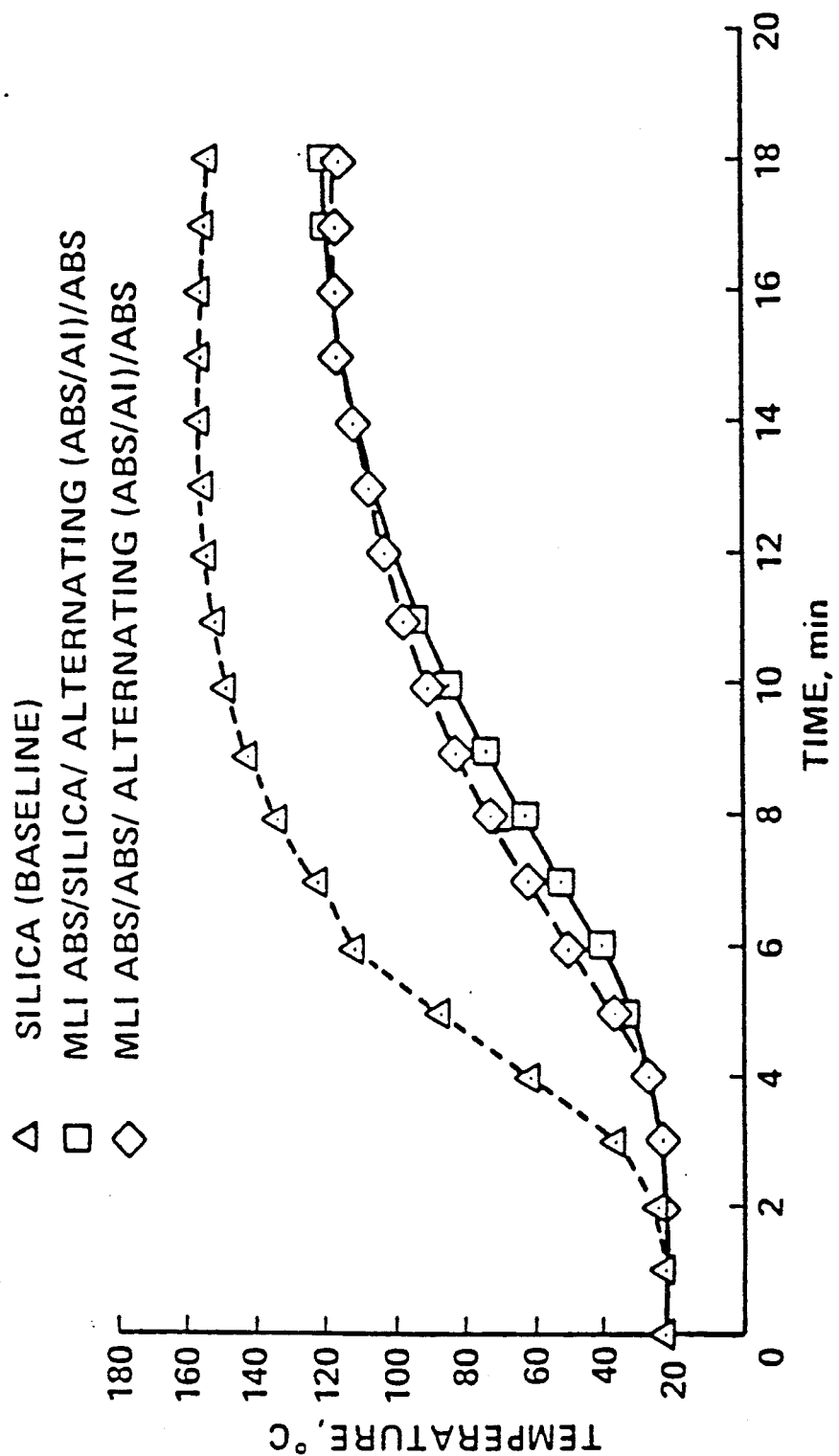
FIG. 9 depicts a comparison of thermal response of aluminum—silica felt or aluminoborosilicate multilayer insulations with silica insulation.
Figure 10:
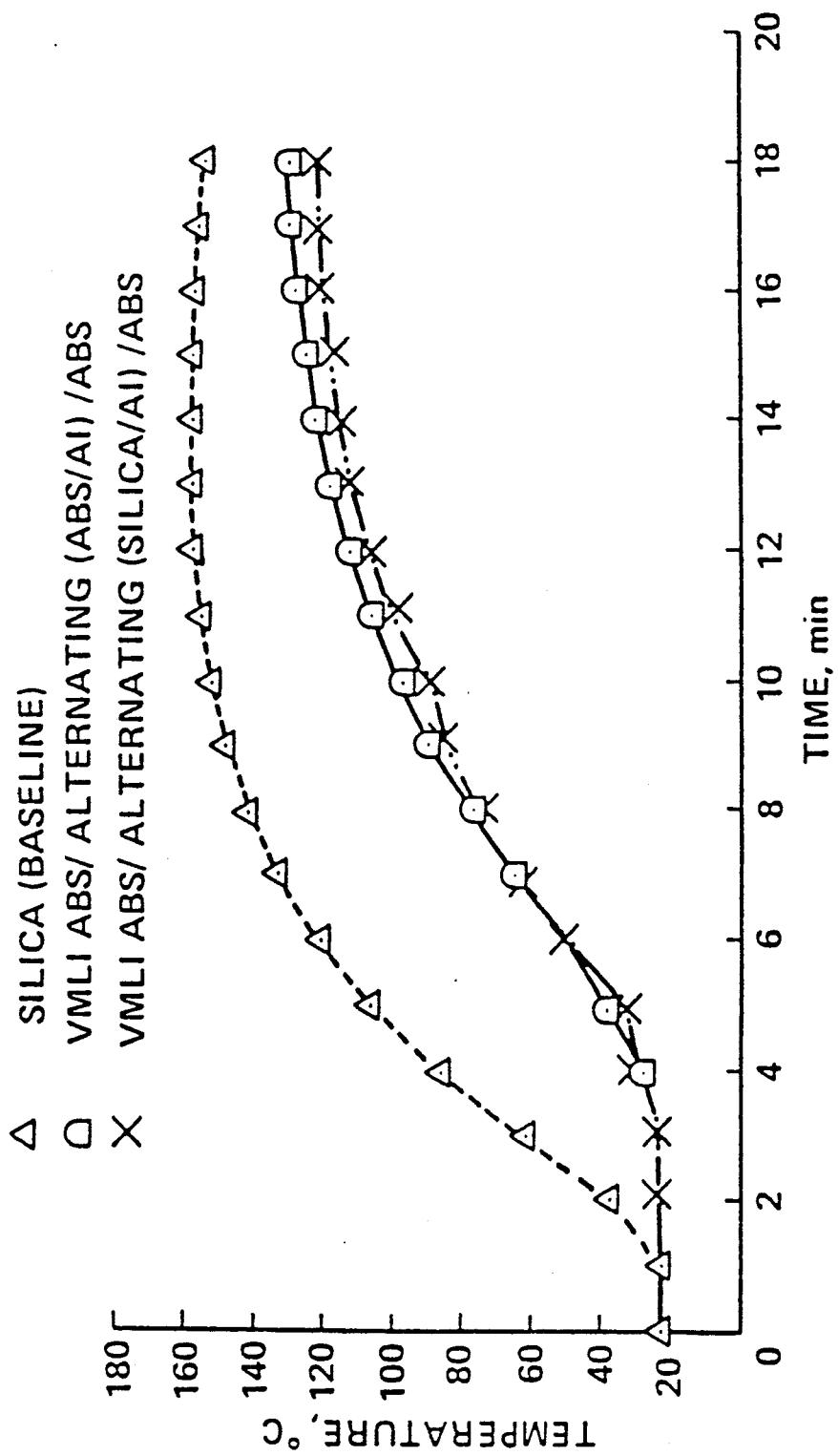
FIG. 10 depicts a comparison of thermal response of aluminum—silica felt or aluminoborosilicate variable multilayer insulations with silica insulation.

FIGS. 8, 9 and 10 compare the 2.4 cm thick aluminum foil composite insulation with the AFRSI 2 of equivalent thickness. FIG. 8 shows a comparison of the MLI and VMLI geometries with the same silica felt compared to the AFRSI 2. There is no significant difference in the thermal performance of the two geometries. However, in the VMLI configuration 6, the top aluminum foil melted due to its proximity to the top surface and heat source, making this type of configuration impractical to use. FIG. 8 is a comparison of the silica (configuration 1) and ABS of insulations in the MLI geometry with the AFRSI. Both of the MLI configurations had lower backface temperature than the monolithic AFRSI 1 or 2.

FIG. 10 compares the same two types of insulation in the VMLI geometry. There is no significant difference between the two types of insulations. This could be attributed to the higher efficiency of the aluminum foils as a reflective shield which diminished any small differences in the thermal efficiency of the insulations.

Figure 11:
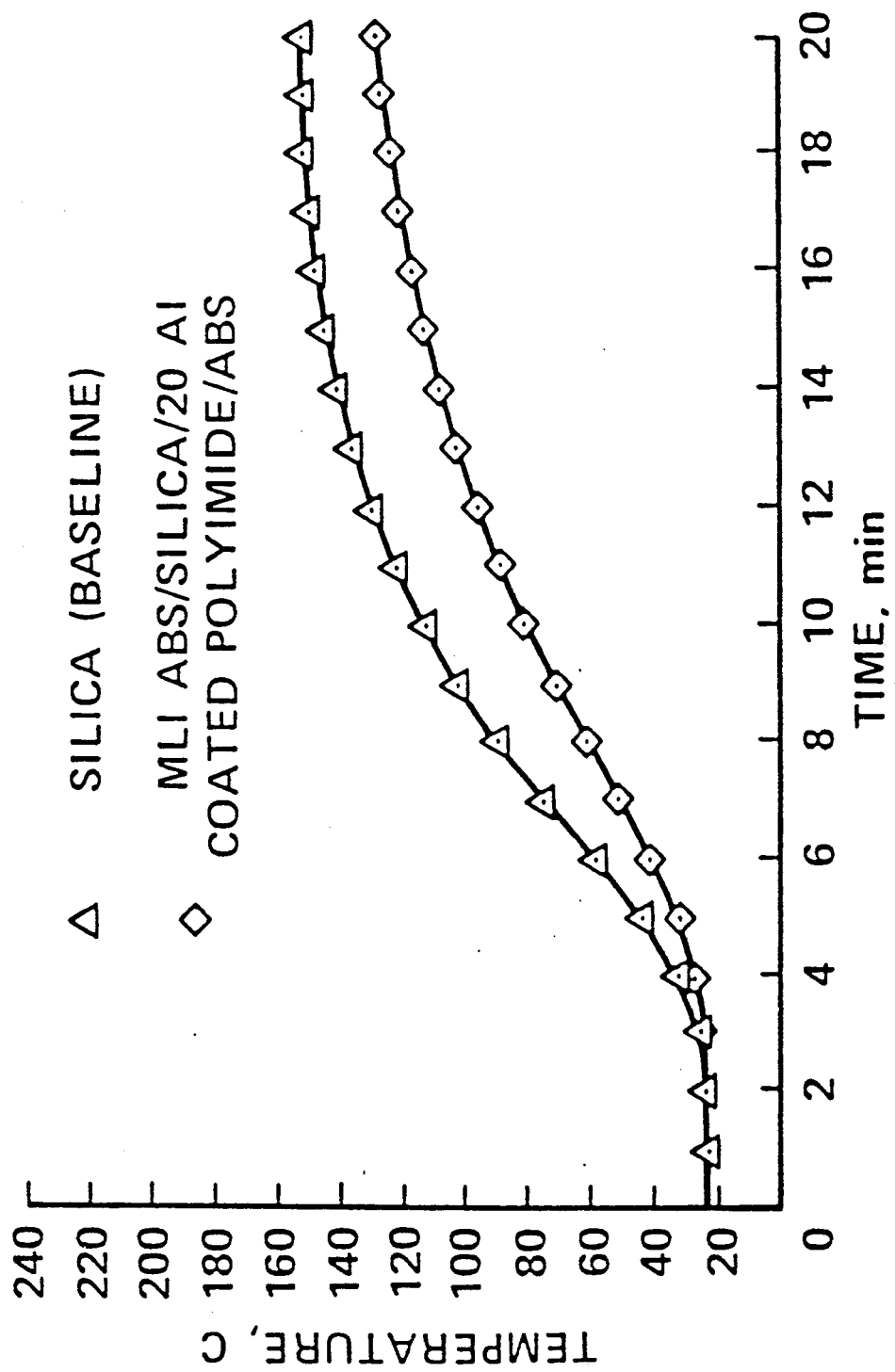
FIG. 11 depicts a comparison of thermal response of aluminized polyimide—silica felt multilayer insulation with silica insulation.

FIG. 11 is a comparison of the configuration 9 containing the aluminized polyimide film with the AFRSI 2. Both insulations were 2.4 cm thick. Twenty layers of the film were used in this configuration and were placed on the bottom of the insulation close to IML. Since the 0.0012 cm thick polyimide film has a relatively high transparency in the far infrared and near infrared region, as described in *NASA* CR-907 (Oct. 1967), it is necessary to have a aluminum coating of sufficient thickness to have relatively low emittance in order to provide efficient radiation shielding. The aluminum coating was vacuum deposited and was approximately 700 Å thick. No damage to the film was observed after repeated test runs. When the film was subjected to the heat cleaning cycles of the insulation at 454° C., no degradation was observed, but the film was slightly curled due to the difference in the coefficient of thermal expansion of the aluminum and the polyimide film. This should not impose a severe problem in the insulation blankets since they are sewn in a quilted configuration.

For successful fabrication of a very high temperature composite flexible blanket insulation, a high temperature sewing thread is necessary. This thread needs to possess the following properties: it must have the capability of being machine-sewn into a quilted blanket, it must survive high heating loads without any substantial damage, it must be light, strong and yet thin enough not to damage the alumina foils excessively, it should not break, kink, snarl, double or twist.

Such a thread had been designed using a silicon carbide material. The thread design is described below. Depending on the thermal exposures, all and any thread having a desired thermal performance, high emission, high break strength, including ABS and silica at less severe conditions, are suitable.

The CFBI of the current invention represents a substantial improvement against previously known insulations. It provides flexible, durable, lightweight, high temperature resistant insulation suitable for repeated use. The invention utilizes currently known and available materials and processes in fabrication of these CFBI which have various configurations, various temperature and emittance parameters and consequently possess various properties. By combining fabrics and sewing threads having a resistance to high heat flux and high emissivity, high break strength and a low density, lightweight CFBI can be designed having desired thermal insulation capability from above 500° C. to about 2000° C. For these CFBI, the availability of the sewing thread having high heat flux and emissivity, breakstrength, low density, and other properties, as describe below, is of utmost importance.

II. THE DESIGN, PREPARATION AND MANUFACTURE OF SILICONE CARBIDE THREAD

Where extremely high temperatures, of between 500° C. to about 2000° C., in particular those of above 1000° C. are applied to insulation, it is desirable to have high temperature resistant, break resistance, flexible yarn or thread which would be suitable sewing insulating structures repeatedly exposed to high temperatures. Depending on the temperature, the properties of these threads differ. The higher the temperature, the higher the demands for thermal performance, for high emissivity and resistance to high heat flux, for high breaking strength and sufficient flexibility and elasticity of the thread.

Several commercially available threads at least partially meeting these demands are known. Aluminoborosilicate (ABS) thread made from ABS yarn known under its trade name Nextel 312 TM is available from 3M Corporation, St. Paul, Minn.; silica thread or yarn known as Astroquartz II TM is available from J. P. Stevens & Co., Inc., Greenville, S.C. These threads are suitable for stitching together the composite flexible insulation blankets which are to be exposed to temperatures up to 1000° C. Beyond this temperature, these threads may experience breakage and mechanical deterioration.

For composite flexible insulation blankets, requiring exposure above 1000° C., it may be necessary to utilize threads which are more temperature-resistant and have high emissivity. One suitable thread which is made from silicon carbide yarn known as Nicalon TM is available from Dow Corning, Midland, Mich., or from Fabric Development, Inc., Quakerstown, Pa. A silicon carbide fabric, which must be utilized when these insulations are exposed to temperatures above 1000° C., is also available from Dow Corning. Silicon carbide thread Nicalon TM, while able to withstand certain high temperatures shows, following a thermal exposure to 1300° C. in air, fiber's sintering resulting in changing of chemical entity SiC to silica dioxide which has much lower temperature resistance. The Nicalon is thus not suitable for repeated high temperature exposures. Moreover, the surface of Nicalon exposed to the same 1300° C. in argon is severely degraded and its tensile strength decreases to about 30% of room temperature tensile strength. This deterioration increases with repeatedly increased temperatures. Also, Nicalon exhibits brittle fractures with cracks occurring predominantly at or near the fiber surface and fracture surfaces of yarns exposed to temperatures 1000° C. exhibit mirror-mist-hackle-crack branching regions and fracture surfaces of fibers exposed to 1300° C. are planar. (*Am. Ceram. Soc. Bull.*, 66:353 (1987).

From the requirements listed above of certain properties needed for fabrication of composite flexible insulation blanket it is clear than Nicalon TM, as commercially available, is not suitable without further processing.

One fiber suitable to be used for fabrication of CFBI for temperatures higher than 1000° C. is a new type of continuous inorganic fiber, known as TYRANNO FIBER ®. This fiber is composed of silicon, titanium, carbon and oxygen from an organic metal polymer precursor. This fiber is commercially available from TEXTRON, Inc., Lowell, Mass.

Another fiber which is especially suitable to be used in CFBI for temperatures above 1300° C. and withstand temperatures up to 2590° C. before melting and retain its fibrous nature to 2480° C., is zirconia fiber, known under tradename ZIRCAR ®, and available from ZIRCAR Products, Inc., Florida, N.Y.

For temperatures between 900° and 1300° C., the SiC thread prepared by the process of this invention is in particular very suitable. It has all required properties for high temperature performance and is thus an improvement over previously known threads and yarns, which are commercially available.

Using the process of this invention, lightweight, flexible, thin, durable, high temperature resistant silicon carbide sewing thread has been designed which consists of two-ply yarn, between about 100 and 140 turns per meter, preferably 122 turns-per-meter Z-twist construction. Two processing aids in thread construction were evaluated. Prototype CFBI were sewn using a SiC thread prepared either with polytetrafluoroethylene (PTFE) sizing or with an overwrap of rayon/dacron service yarn. For PTFE, a 5% PTFE sizing is preferred because the large fiber diameter of SiC filament makes the thread too large, coarse and irregular when 20% PTFE is used for sewing. Of the two processing aids, the rayon/dacron-wrapped SiC thread was found to be stronger, had higher break-strength retention and had done less damage to the outer-mold-line fabric. This thread enabled thermal protection system articles to be sewn or joined, or have perimeter close-out of assembled parts when using SiC fabric for high-temperature applications. Thus, rayon/dacron wrapped SiC thread is in general preferred to 5% PTFE, which is preferred to 20% PTFE.

These SiC filaments typically have a filament diameter of about 10–20 microns, preferably 15 microns. These filaments are subsequently bundled into a twistless SiC tow typically constructed from 200 to 500 filaments, preferably 250 filaments. This tow is then twisted in the s-direction having between about 100 and 140 (preferably 122) turns per meter, into a yarn of 900 denier. The yarns are run in a Fletcher (of Southern Pines, N.C.) down twisting machine (or its equivalent). Alternately, a 600 denier yarn was prepared by using 10–14 microns, preferably 12 microns diameter filaments. The SiC sewing thread was then prepared by plying together two yarn bundles to form the sewing thread containing a total of 500 filaments.

Filament density was about 2.55 g/cm$^3$. When the tow is first twisted in the s-direction, the yarns are then twisted about the same twist in the z-direction. Two of these yarns were ply-twisted in a z-direction using between about 100 and 140 (preferably 122) turns per meter twist to produce service yarn. An organic yarn constructed of 50 denier Rayon was x-wrapped over the 2-ply service yarn at 17 wraps (turns) per 2.5 cm followed by an additional overwrap of a 70 denier Dacron yarn x-wrapped at 8 wraps per cm. An Atwood (Stonington, Conn.) serving machine (or its equivalent) is used to overwrap the ceramic fiber. An alternate thread using PTFE as a sizing replacing the service yarn could also be used. A water dispersion of PTFE was coated on a the 2-ply twisted yarn such that weight of about 5% PTFE was added to the thread surface. The PTFE was baked to remove water and fuse PTFE particles on the thread surface. The PTFE sizing can be performed by special order by Filtec, Inc., Hagerstown, Md.

The second, chemical or thermal treatment is used to affect strength properties and involves the coating of 5%–20% by weight water dispersion of PTFE on the surface followed by infrared heating at 325° C. to fuse the PTFE. The purpose of this treatment is to add flexibility and strength to the twisted thread yarns for the sewing operation. However, in certain embodiments of this invention, in particular rayon/dacron SiC, does not need this sizing step.

The third treatment of the SiC thread was the mechanical action of sewing operation that may change the properties of the thread because of the multiple bending and turning on a multi-bobbin sewing machine required to form the modified lock stitch that holds the CFBI together. The results of this testing are described below.

After fabrication of the CFBI, a fourth treatment is usually used to heat-clean the fabric surface of contaminants before installation on the Space Shuttle. The heat-cleaning is a two-step procedure starting at room temperature, raising to 343° C. and holding for 4 hours, then raising to 454° C. for 2 hours. This treatment was followed by cooling and removal. The CFBI was then waterproofed by a CVD process which vaporized methyl-trimethoxysilane and deposited it on the blanket surfaces, providing a hydrophobic barrier for protection from both rain and condensation.

As pointed out above, 2-ply twisted yarn was coated with a water dispersion of PTFE. In this way, about 5% of weight was added to the thread surface. To remove this water, the thread was baked for 1–4 hours, preferably for 2 hours at 20° C.–500° C., preferably by raising temperature from room temperature to about 450° C. during two hours.

A range of conditioning temperatures was selected for the threads that would include the flight temperatures experienced by the CFBI used in space. The threads were thermally conditioned from 90° C. to 1200° C. Break-strength measurements were obtained for threads having the characteristics of the four different treatments. All data obtained were compared to each treatment to determine whether the strength properties of the thread were degraded or changed after exposure of these temperatures.

Three types of SiC thread were prepared according to procedure described above and under conditions described in Example 1. The threads were tested for their break strength according to Example 2, subjected to thermal analysis by the following procedure, thread balance and twist were determined. Testing procedures are described in *SAMPE Quart.*, 18:32–39 (1987); *Ibid.*, 20:3–8 (1989); and *Ibid.*, 16:17–21 (1985).

A DuPont 950 Thermogravimetric Analyzer was used to determine the decomposition temperature at which 100% of the organic finish, sizing or service yarns used to process the SiC thread was removed. The weight fraction remaining after a 10-min thermal soak was also determined. Ten milligram samples were prepared and heated in air at a heating rate of 10° C./min to a constant weight as confirmation of total decomposition of the organic processing aids.

As described in Example 1, the thread suitable to be used in a sewing machine must have a balance. This means that the thread must have a ply-twist which allows the thread to hang in a loop without kinking, doubling or twisting upon itself.

Figure 12:
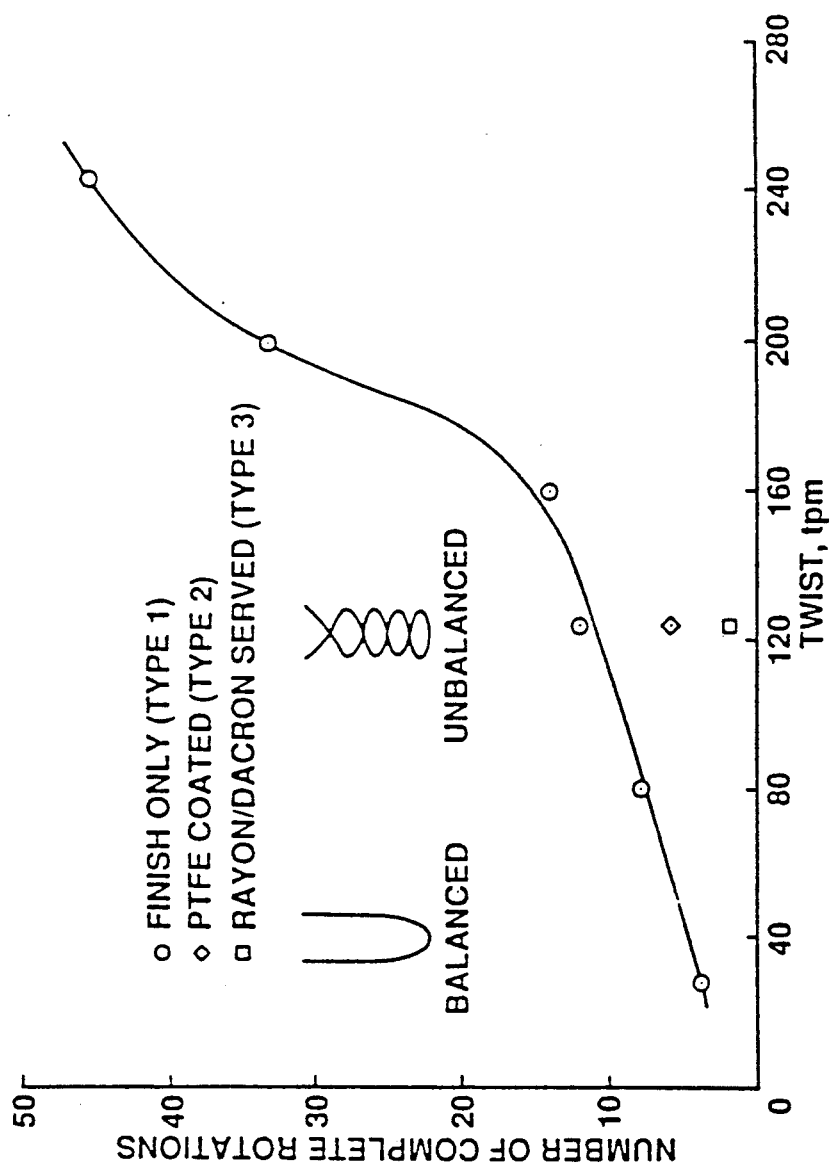
FIG. 12 shows an effect of twist on silicon carbide (SiC) thread balance.

FIG. 12 shows the effect of twist on thread balance for the six different twist conditions in the Type 1 set of threads described in Example 1. Twist is expressed as turns per meter (TPM). As expected, the lower the twist, the lower the number of rotations. The number of rotations ranged from three rotations at 28 TPM to about 12 rotations at 158 TPM. Thread twists above 158 TPM for the SiC ply-twisted yarns produced excessive snarling, thus making the threads unsuitable for sewing. Both PTFE coated thread Type 2 and rayon/dacron thread Type 3 were very balanced, with only about five rotations for type 2 and two rotations for type 3.

Figure 13:
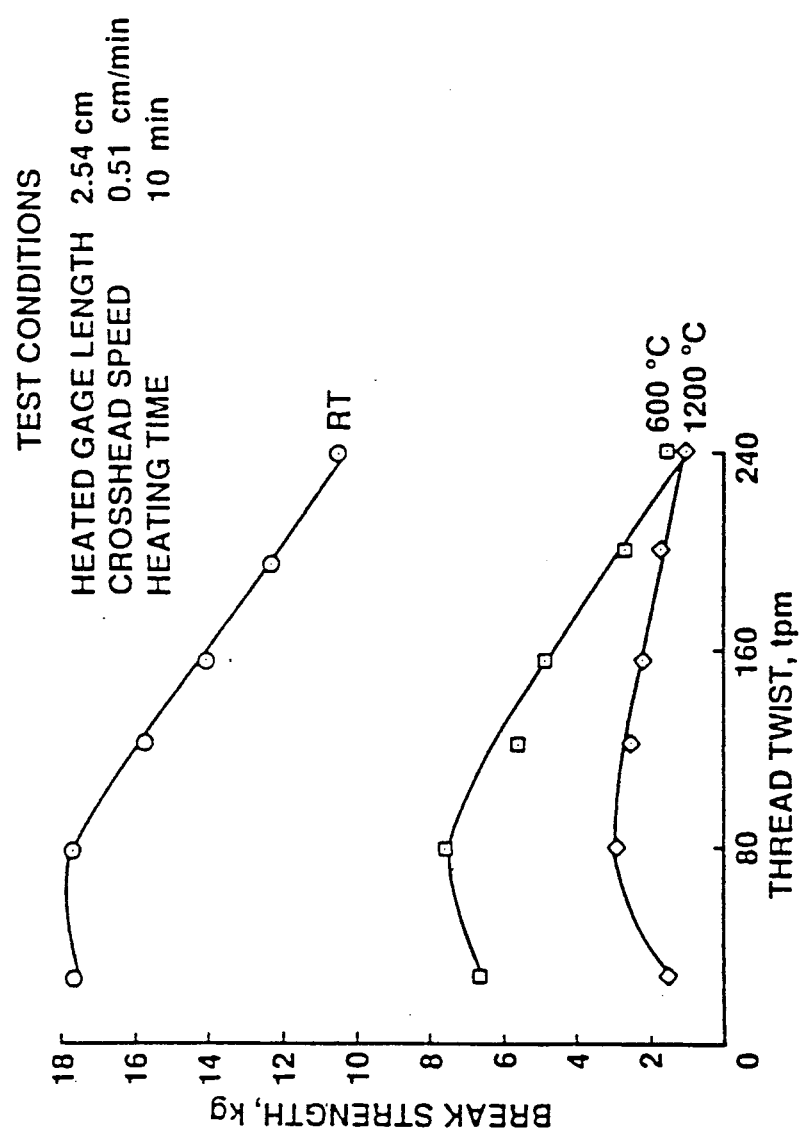
FIG. 13 shows an effect of twist on break strength of silicone carbide threads.

The thread balance, the thread's twist and temperature all affect break strength of silicone carbide thread. The Type I (with finish only) threads prepared with different twists were measured for break strength according to Example 2. Six levels of twist were tested ranging from a low twist (almost two-like) to a high twist (excessive) level as characterized from the thread balance study. FIG. 13 shows the effect of different twist levels on the thread break strength. Three different temperatures were tested: room temperature, 600° C. and 1200° C. Break strengths were measured after thermal conditioning for 10 min at these three temperatures, as a test of performance at the various operational conditions for space use.

The SiC threads were measured in the "as received" state at room temperature (RT) to simulate a prefabrication condition. Maximum break strength was obtained with 39 to 79 TPM. There was a decrease in strength above 79 TPM that was inversely proportional to the degree of twist. After testing at 600° C., as shown in FIG. 12, a parallel break strength pattern was evident. However, the overall strength was reduced to about 40% of the original strength because of the destruction at high temperatures of the organic processing aids used to enhance handling and fabrication. Apparently this removal makes the SiC yarn susceptible to filament damage. At 1200° C., a thermal exposure that could be experienced during repeated exposure to high temperatures, a further decline in strength resulted, with peak strength at 79 TPM and a subsequent more gradual linear loss of thread strength with increasing twist. At this temperature, any filament damage induced by friction stresses in the twisting process adds to the strength loss.

Figure 14:
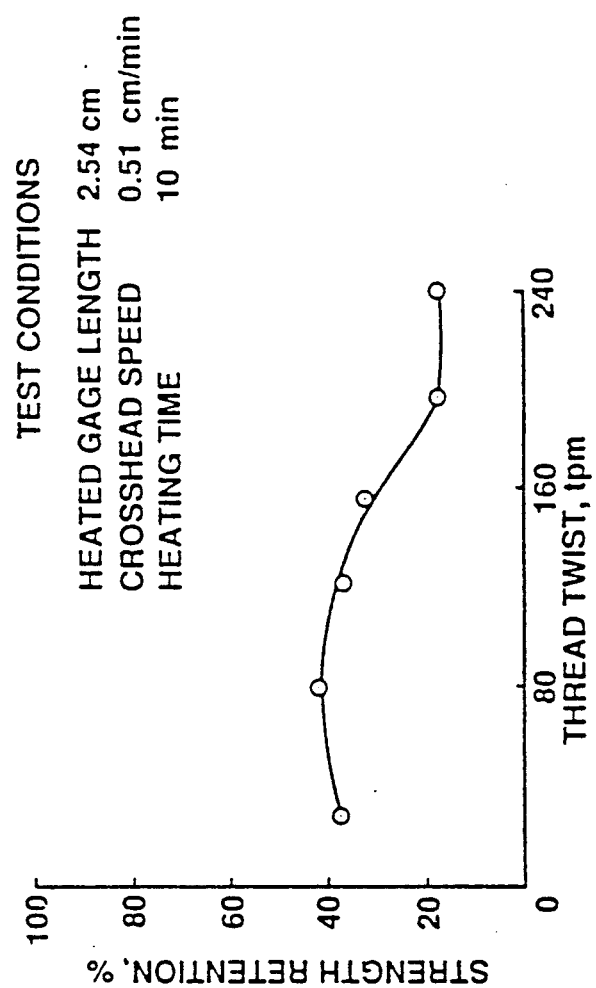
FIG. 14 illustrates strength retention of twisted SiC threads at 600° C.

The effect of twist on strength retention at 600° C. is shown in FIG. 14. Under these conditions, it would be best to use the thread twist that has the greatest strength while providing a thread that can be used in a machine. There is about a 40% strength retention between twist levels of 28 and 122 TPM, and then a decline to about 18% of the original strength at 197 TPM. A thread twist between 28 and 122 TPM thus is optimal for strength, but the twist of 28 TPM can be eliminated because the low twist results in a loose, irregular thread with tow-like behavior that is unsuitable for sewing.

Figure 15:
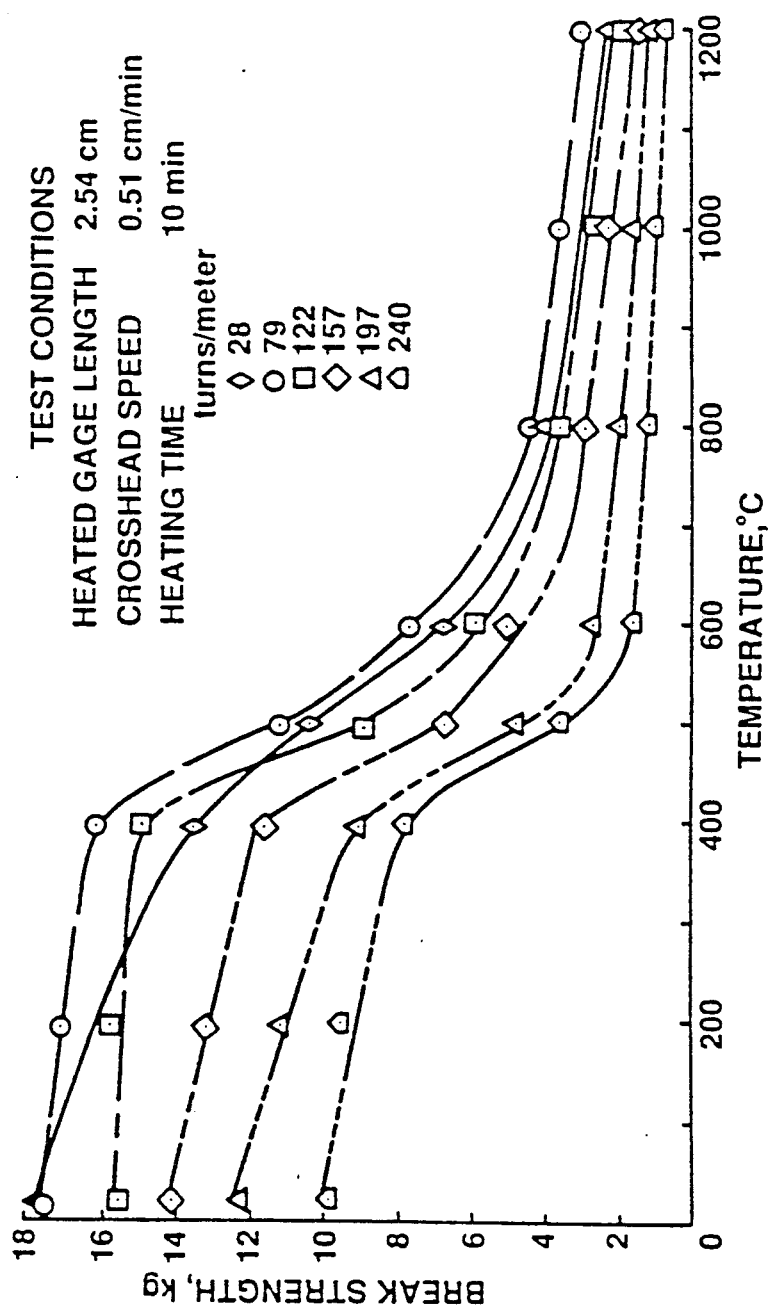
FIG. 15 illustrates effect of temperature on break strength of silicone carbide thread with different twists.

FIG. 15 shows the influence of temperature on SiC threads prepared at the six twist levels. Strength profiles are similar for all twist levels over the range of temperatures used. Highest strength was obtained from the 79-TPM thread, and decreasing strength followed increasing twist through a series of twist levels. An exception was the thread with the lowest twist, of 28 TPM. In this construction, with nearly zero twist, the individual filaments were stressed unevenly, resulting in lower or uneven measured strengths. However, in all cases, the strength profiles showed the characteristic sharp loss of strength between 400° C. and 600° C. caused by decomposition of the organic yarn finish. Also, there was a gradual loss of strength between 600° C. and 1200° C. independent of the twist. In addition to thread balance, twist and temperature, a processing aid also effected the break strength.

Figure 16:
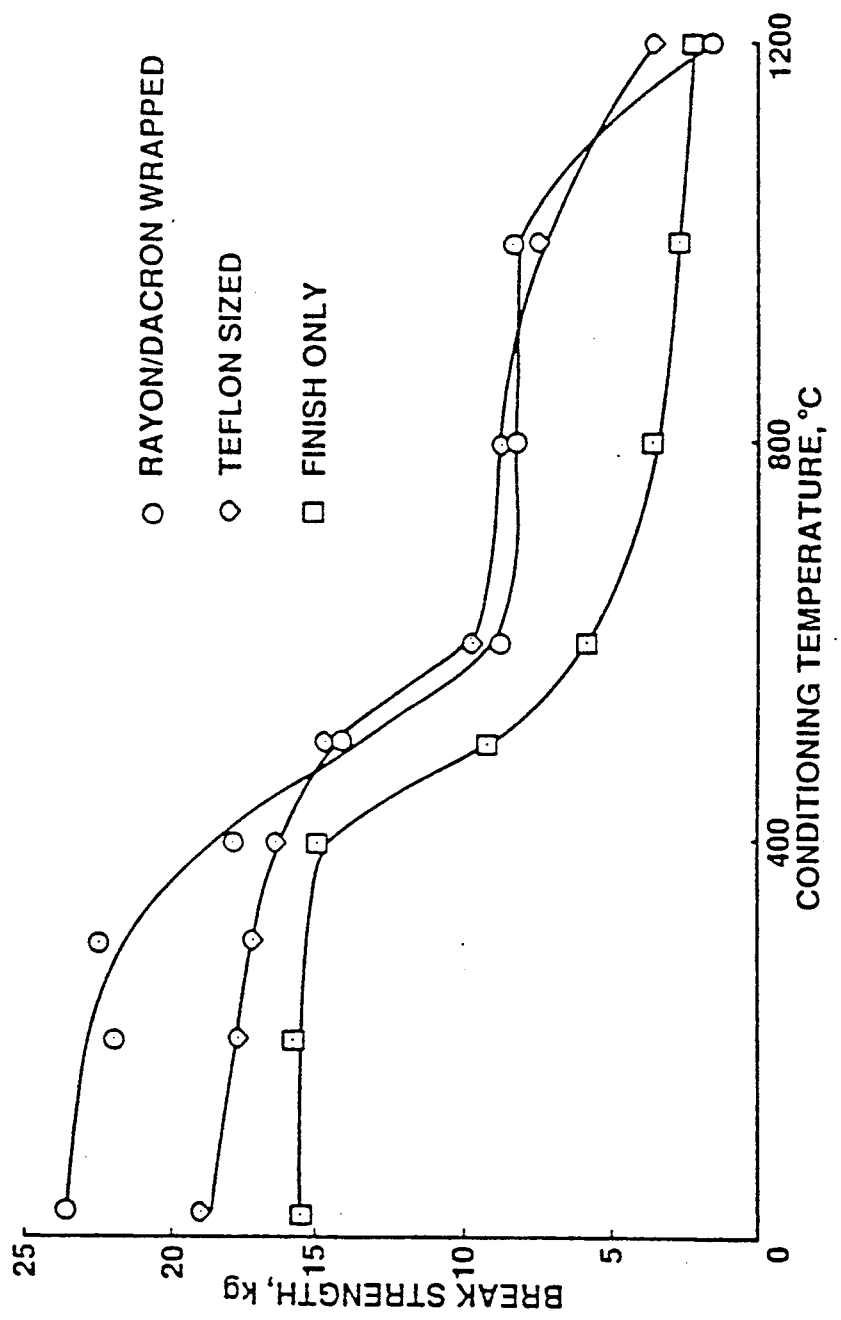
FIG. 16 depicts influence of processing aids on silicone carbide thread strength.

FIG. 16 shows the effect of introducing a processing aid to the 122-TPM Z-twist baseline thread construction. The break strength after different conditioning temperatures was measured for the PTFE-sized thread (Type 2) and the rayon/dacron-served thread (Type 3), and compared to that of the baseline thread (Type 1). The room-temperature break strength was higher for both treated threads than for the Type 1 thread over the entire range of conditioning temperatures tested. This implies that no measurable yarn damage resulted from the application of sewing aids. Between 600° C., where all the organic processing aids are thermally removed, and 1200° C., the two treated sewing threads exhibit nearly identical strength. The rayon/dacron-served thread showed higher strength at the lower temperatures (between room temperature and 400° C.), possibly because this processing treatment reduces the frictional stresses of the individual SiC filaments more effectively than PTFE-sizing does, thereby reducing individual fiber damage.

Based on the results of the Type 1 thread studies, a twist of 122 TPM was selected for the SiC sewing thread. This decision was based on the interrelationship of the processing treatment and handling characteristics as well as on the influence of twist on the thermomechanical properties. Typically, the performance of ceramic sewing threads when used in a sewing machine is enhanced by the application of processing aids such as sizings (coatings) or service yarns. These aids reduce yarn breakage during sewing. For this study, the threads with processing aids (Type 2 and Type 3) were both prepared using the 122 TPM of twist.

The choice of 122 TPM as the twist parameter was the best compromise for handling capabilities acceptable for machine sewing. This was evident from the thread balance study results presented in FIG. 12. Both Type 2 and Type 3 threads showed a lower tendency to form complete loop rotations (5 loops and 2 loops, respectively) than the SiC yarn twisted at 122 TPM without processing aids. Twist levels of less than 122 TPM, although producing fewer rotations, displayed excessive looseness or unevenness of the yarn. This generally causes improper wrapping of the service yarn or irregular sizing deposition on the yarn surface. These defects would ultimately cause thread breakage or snarling during machine sewing. Finally, it was noted (see FIG. 2) that the strength retention of the 122-TPM thread was the highest for the twist levels above 79 TPM.

Figure 18:
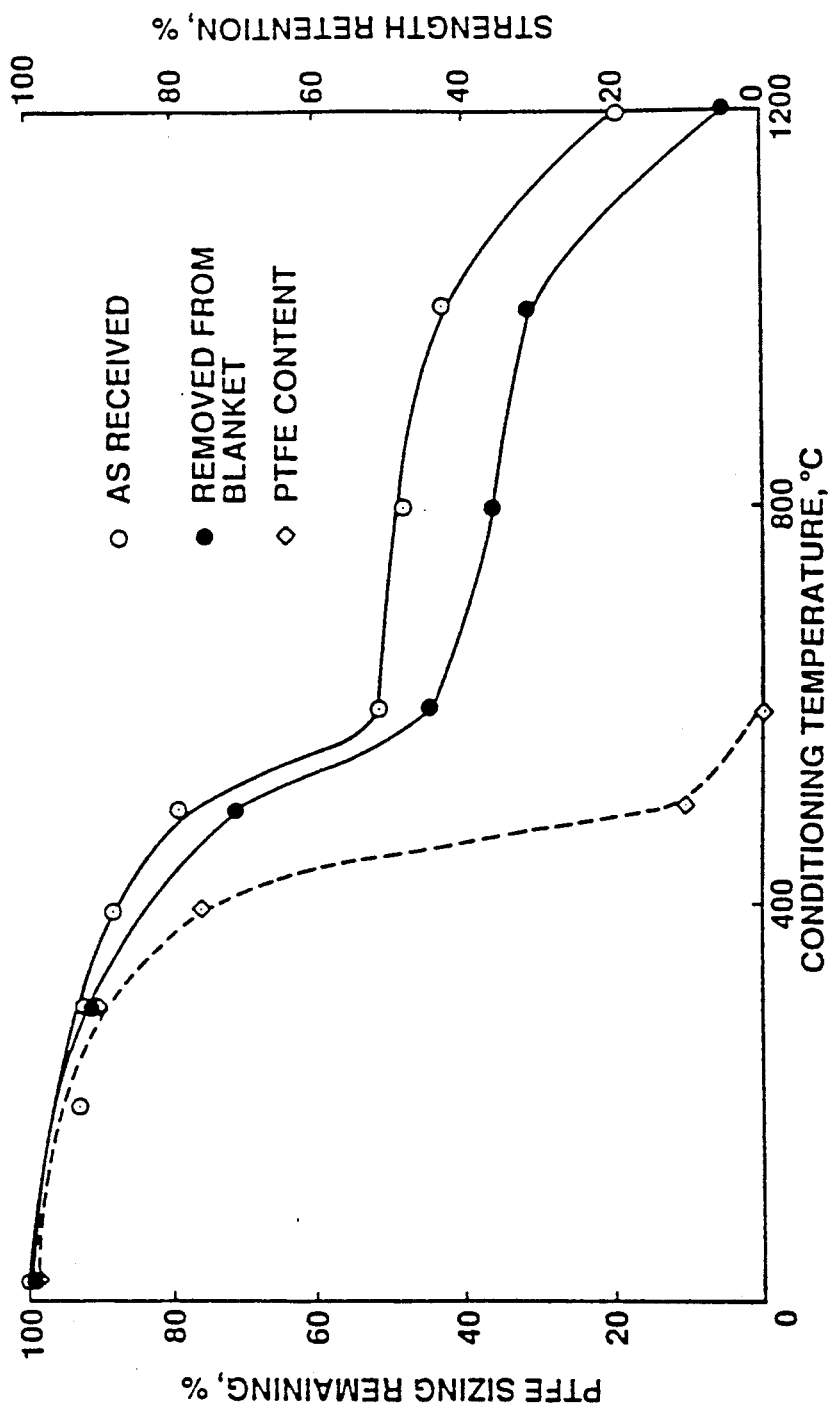
FIG. 18 illustrates effect of sewing process on strength retention using PTFE-sized thread.

Both Type 2 and Type 3 sewing threads were evaluated for their suitability for machine sewing. A 2-ft-square, quilted, sewn blanket was prepared using each type of SiC sewing thread. The blanket construction is illustrated in FIG. 18 and can be also seen in cross-sectional view in FIG. 2. Blankets consisted of an 8-harness satin-weave SiC fabric as the outer mold line (OML) fabric, an inner mold line (IML) fabric of glass, and a ½ inch layer of 6-lb/ft$^3$ silica insulation sandwiched between the fabric layers. A modified lock stitch, described in *SAMPE Quart*, 16:17–21 (1985), in a 2.5 cm$^2$ stitch pattern was used to contain the assembled blanket. The sandwich construction was stitched together using the Type 2 or Type 3 experimental threads as the OML thread together with an IML glass thread.

A single-needle Adler sewing machine available from Adler Corporation, Frankfurt, West Germany was used to sew the prototype blankets. Both the PTFE-sized SiC thread (Type 2) and the rayon/dacron-served SiC thread (Type 3) successfully survived the high-speed bending and turning of the machine sewing process. The rayon/dacron-service SiC thread showed the best performance, providing a uniform, tight quilted surface. It suffered less yarn damage than did the PTFE-sized SiC sewing thread. The PTFE-sized thread provided a usable blanket, but produced more observable needle-punch damage while forming the modified lock stitch.

Break-strength measurements of the actual Type 2 and Type 3 threads used to fabricate the SiC fabric-faced blankets were obtained at different conditioning temperatures after extracting the sewn thread from the assembled blanket. These strength measurements were then compared to those of the same types of thread before sewing. FIG. 18 shows the strength retention profile for both the "unsewn" PTFE-sized thread (Type 2) and the same thread after removal from the sewn blanket. This figure also shows a plot of the weight fraction of PTFE remaining versus the temperature, to show the influence of the processing aid on strength retention during thermal removal. Strength retention for the unsewn thread drops from about 95% to 200° C. to 52% after 100% of the PTFE sizing has been removed, at 600° C. From 600° C. to 1000° C., the amount of break strength retained decreases gradually to about 42%. Between 1000° C. and 1200° C., strength retention falls to 20%, again probably influenced by chemical changes on the fiber surface, as previously discussed. The strength retention for the sewn thread parallels that of the unsewn thread between room temperature and about 600° C. However, at 600° C. (100% loss of PTFE sizing) strength retention was about 44% compared to 52% for the unsewn thread. Only 5% of the thread strength was retained at 1200° C. for the sewn thread. This reduced strength retention after the PTFE sizing has been removed at above 600° C. indicates that yarn damage occurred during the sewing process.

Figure 19:
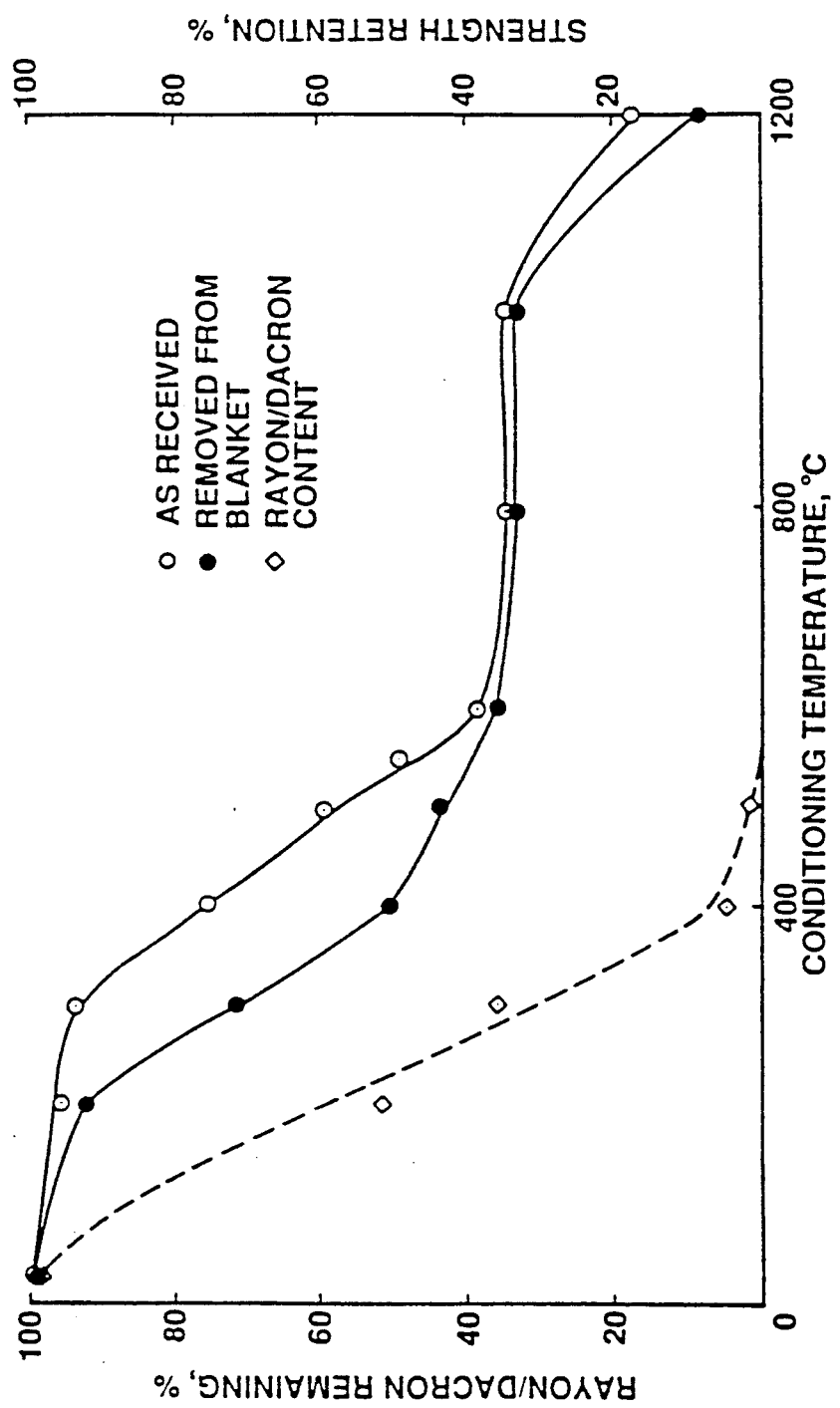
FIG. 19 illustrates effect of sewing process on strength retention using rayon/dacron-served thread.

FIG. 19 shows the strength of the rayon/dacron-wrapped thread in the unsewn state compared to that of the sewn thread taken from the blanket. From room temperature to 200° C., about 95% of the original strength remains for the unsewn thread and 93% for the sewn thread. This indicates that the rayon/dacron service yarn is functioning well during the machine sewing process. At 600° C., when all the organic service yarn has been thermally removed, the strength remaining is 37% for the unsewn thread and 35% for the sewn thread. FIG. 18 also shows that the organic service yarn is thermally decomposed faster than is the PTFE sizing, which may account for the greater strength-retention difference between the sewn and unsewn condition of the rayon/dacron-served thread between 200° C. and 600° C. Between 600° C. and 1000° C., the strengths are nearly identical, with the sewn thread maintaining only 2% less strength. These results imply minimal yarn damage resulting from the machine sewing process after removal of the organic service yarn. Also, the Type 3 thread had better strength retention than did Type 2 after sewing, with only a 2% change (37% to 35%) compared to the 12% change (42% to 30%) at 1000° C. for the Type 2 SiC thread. This difference was also reflected in the rayon/dacron-wrapped SiC thread showing less thread breakage (as judged by visual inspection) after machine sewing, and in less damage to the OML fabric due to needle penetration.

Two processing treatments, a PTFE sizing and a rayon/dacron service yarn overwrap on the two-ply twisted thread construction, evaluated as aids for machine sewing were found to have superior qualities to yarns known before. These SiC threads had a finished diameter approximately 0.028 inches and were to inventors' knowledge, the first successfully made SiC threads of superior qualities. Break-strength measurements showed that both threads prepared with processing aids maintained higher break strength than did the twisted thread without processing aid, over the entire temperature range (room temperature to 1200° C.) tested. Sewing trials conducted with both treated threads were acceptable, although rayon/dacron-served thread produced a sewn blanket with greater thread strength retention and less fabric damage.

Generally, the design of a SiC sewing thread required a combination of optimum twist level for strength and balance plus a suitable processing aid to minimize yarn and fabric damage during the dynamic machine sewing process. These SiC-sewn blankets will be characterized for aero-acoustic durability from the aerodynamic forces experienced in a hypersonic reentry environment.

UTILITY

Multilayer insulations consisting of alternating metal foils and scrim cloth or aluminized polyimide film were evaluated for thermal performance. These composite flexible insulations were compared to the AFRSI.

The merits of each insulation system were based on their thermal response or backface temperature increase as measured in a thermal diffusivity apparatus and their density. The multilayer insulations containing aluminum were the most efficient systems measuring up to fifty percent reduction in backface temperature increase when compared with the silica baseline insulation system, however, these composite insulations were slightly heavier than the baseline.

The 2.4 cm thick AFRSI configuration 1 and 2 reaches a backface temperature of approximately 160-170° C. at 15 min when tested at 20 mm Hg pressure in accordance with the procedures described. The composite insulation 5-8 with the alternating ABS-/Alumina layers with either silica or ABS insulation reaches 110-130° C. backface temperature at equivalent time. Thus, there is a much higher insulation capability in insulations 5-8. The weight penalty for these composite insulations is approximately 24%.

The composite flexible insulation 9 consisting of aluminized polyimide film with silica insulation reaches a backface temperature of 110° C. at 15 min when tested at 1.5 mm Hg pressure. The AFRSI 2 of equivalent thickness and density reaches a backface temperature of 145° C. at 15 min. Thus, there is a clearly much higher insulation capability of insulation 9 when compared to AFRSI insulations 1 and 2, without any weight penalty attached.

The effectiveness of the multilayer component increases as a function of overall thickness of insulation. The multilayer insulations were most effective in the 2.4 cm thick configuration.

The composite insulations containing the aluminized film have multiple utility. First, they could provide weight savings for aerospace vehicles providing at the same time an excellent thermal insulation. These insulations which are flexible, durable and lightweight would be equally useful for manufacture of firemen's suits, tools and equipment, in the steel molding industry, for thermal insulation of extreme temperature habitats in space applications, furnaces, pools, boats and airplanes and for any other use requiring high temperature insulation achieved with lightweight material.

The following Examples are to be interpreted as descriptive and illustrative only. They are not to be construed as being limiting in any way.

EXAMPLE 1

Silicone Carbide Sewing Thread

Three types of experimental SiC sewing thread were prepared for screening the thermomechanical properties and sewing trials, as shown in Table 3.

TABLE 3

| THREAD CONSTRUCTION | | | |
| --- | --- | --- | --- |
| Type | Service Yarn | Sizing | Twist, TPM |
| 1 | None | None | 28, 79, 122, 158, 197, 158 |
| 2 | None | PTFE | 122 |
| 3 | Rayon/Dacron | None | 122 |

All of the threads were of 900-denier SiC yarn with a standard epoxy finish, in a two-ply yarn construction in a Z-twist direction. For Type 1, six different thread were constructed using the following turns per meter (TPM) of twist: 28, 79, 122, 158, 197 and 240. No service yarn or sizing was used. Type 2 thread was constructed in a 122-TPM, Z-twist form only, and was given a sizing treatment of PTFE. Type 3 thread was also of 122-TPM, Z-twist construction. A service yarn was used for Type 3, constructed of 50-denier rayon X-wrapped with two ends at 17 wraps per 2.5 cm plus an additional overwrap of a 70-denier dacron yarn X-wrapped at 8 wraps per 2.5 cm.

A 900-denier SiC yarn was used to prepare test yarns which were two-ply-twisted at different twist levels. A twist level of 122 TPM was determined to offer the highest strength with an acceptable thread balance. Two processing treatments, a PTFE sizing and a rayon/dacron service yarn overwrap on the two-ply twisted thread construction, were evaluated as aids for machine sewing. Break-strength measurements showed that both threads prepared with processing aids maintained higher break strength than did the twisted thread without a processing aid, over the entire temperature range (room temperature to 1200° C.) tested. Sewing trials conducted with both threads were acceptable, although the rayon/dacron-served thread produced a sewn-blanket with greater thread strength retention and less fabric damage.

Thread that can be used in a sewing machine must have balance. This means that the thread must have ply-twist that allows the thread to hang in a loop without kinking, doubling or twisting upon itself. Unbalanced threads have sufficient twist to produce a torque effect that causes untwisting and retwisting in the opposite direction.

A method used for measuring of thread balance, described in *Am. Soc. Test. Mat.*, 7:98-111 (1983), is to prepare 1 m length of thread and form it into a loop, hold the two ends of the thread about 100 mm apart at the top of the loop, and count the number of complete rotations the loop makes.

EXAMPLE 2

Break Strength Measurements

Break-strength measurements of the SiC sewing threads were made under two test conditions. The first set of measurements was obtained at temperatures produced by a custom-fabricated ceramic furnace placed in the test zone of an Istron Test Machine, Model 1122. The furnace description and test methodology are described in *SAMPE Quarterly*, 17:7-13 (1985). The sample preparation and testing procedures were the same as those used in *SAMPE Quarterly*, 16:17-21 (1985).

Typically, the thread was placed in the heated furnace section for a 10-min heat soak at the test temperature, and then the thread break strength was obtained at this temperature. The threads were tested at a 0.51-cm/min crosshead speed, and a charge speed of 5.1 cm/min; a total length of 2.54 cm was exposed to the heated section of the furnace.

The second set of break-strength measurements was obtained from the same Instron Test Machine, but the thread test specimens were removed from the spool or were taken from 1.3-cm-thick quilt blankets sewn in a 2.54-cm square stitch pattern. The thread specimens were precut 10 cm lengths before thermal conditioning for 2 hr at temperatures ranging from room temperature to 1200° C. Break strengths were obtained at room temperature.

EXAMPLE 3

Fabrication of Composite Flexible Blanket Insulation

The following procedure describes the fabrication of composite flexible blanket insulations with a variety of materials.

Depending on the exposure temperature of the blanket, outer mold line (OML) fabric material was either silica, aluminoborosilicate or silicon carbide. For high temperature application, the CFBI was constructed as follows: OML SiC type NLM 202, 15 harness satin weave with sizing type M, yarn count 48 warp×46 fill per inch, 200 filament 600 denier yarn, yarn construction ½ warp, ½ fill, fabric weight 8.4 oz/yd². These OML materials were obtained from Dow Corning, Midland, Mich. OML forms the top surface layer of the blanket exposed to the most heat.

Inner mold line (IML) fabric material was aluminoborosilicate known as NEXTEL 312, TYPE AF-9, yarn count 1259×1259 per meter 4 harness satin, 185 g.

per sq. meter. NEXTEL was obtained from 3M Corp., St. Paul, Minn.

IML was at the bottom of the insulation blanket facing or being attached to the subject being insulated. IML formed the backface of the insulation. Optionally, it was also positioned between the insulation and multilayer area.

Insulation was generally positioned as a single silica layer just under the OML and was made of Thermal Fibrous High Temperature Insulation material obtained from Manville Corp., Denver, Colo. Insulation was Q-Fiber Felt, 6 pcf, heat cleaned at 1000° F. for 2 hours. Insulation conformed to the publicly available Rockwell Spec No. MBO 135-102, Type 1, Class 2.

Using the same manner of fabrication, insulation was interchangeably made of aluminoborosilicate NEXTEL 312 TM insulation, or alumina known as Saffil®, available from Babcock & Wilcox, Augusta, Ga.

Multilayer area (MLA) was made of alternating sheets of reflective shield foil and spacer. There were between 9–20 layers of both materials.

The reflective shield foils were chosen from the following products generally available from Sheldahl, Inc.:

Aluminized Kapton®, vacuum deposited aluminum on one side of 0.0003 inch Kapton, 0.007 g/in².

Aluminized Kapton® vacuum deposited aluminum on both sides of 0.0003 inch Kapton, 0.007 g/in².

Aluminized Kapton® vacuum deposited aluminum on both sides of 0.0003 inch Kapton with bonded ceramic scrim cloth (Orcon Corp.) 1.4 oz./yd². Vacuum deposited aluminum shall be 12 microns thick with a typical solar absorbance of 0.14 and typical room temperature emittance of 0.05.

The spacer was generally chosen from aluminoborosilicate scrim, silica felt and/or polyimide film. Aluminoborosilicate scrim cloth was constructed from NEXTEL 312 yarn, 600 denier, 275×275 yarns/meter, 52 per sq. meter is obtained from 3M Corp. Silica felt was made of Astroquartz II TM material obtained from J. P. Stevens & Co., Inc. Polyimide film spacer was Kapton TM obtained from Sheldahl, Inc.

The multilayer area was situated under the insulation and was sandwiched between insulation and backface IML.

In the process of fabrication, these layers were put one on each other starting with IML fabric at the bottom, MLA made of alternating spacers with reflective shield foil positioned above IML fabric, MLA being optimally covered with one layer of IML fabric positioned between MLA and insulation. Insulation was covered with OML fabric forming the extreme top surface.

All these layers were sewn together using a ceramic thread as seen in FIG. 2. OML thread was chosen from the group of zirconia thread, TYRANNO FIBER® thread, silica, ABS, silicon nitride or silicon carbide. These threads made by the procedure described in Examples 1 and 2 of this application or were obtained from 3M, Nippon Corporation, Dow Corning or Fabric Development, Inc., with the following characteristics. Silicon carbide thread, 2 ply silicon carbide NICALON, NLM 202 constructed from 900 denier yarn, 3.1 2-twist per inch, served with Rayon/Dacron yarn.

IML thread is the thread catching the OML thread at the backface of the insulation. IML thread was ABS NEXTEL 312, type AT-21 obtained from 3M Company or SiC thread.

Sewing was done by using a heavy-duty multi-needle sewing machine available from Adler Corporation, Frankfurt, West Germany. The top needle was as thin as possible to minimize damage to foils.

Figure 20:
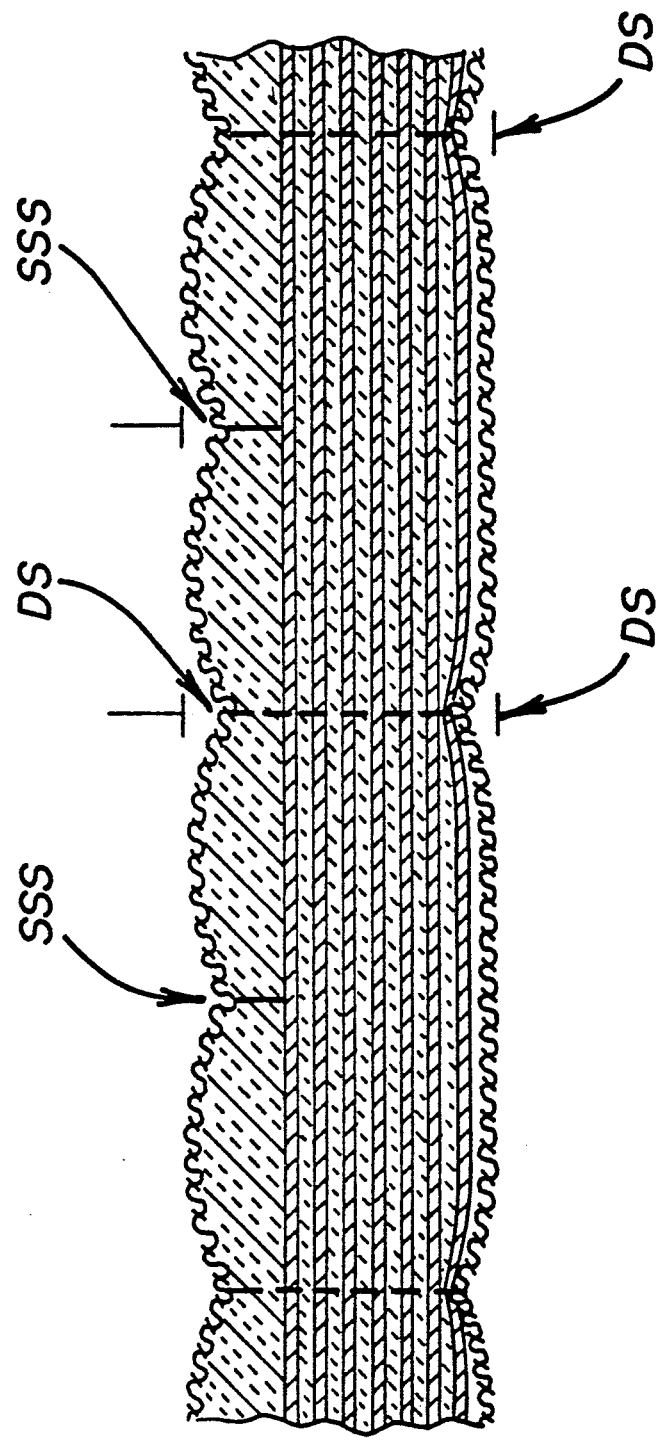
FIG. 20 shows the stitch pattern 2.5 cm² used for sewing the insulation blanket.
Figure 21:
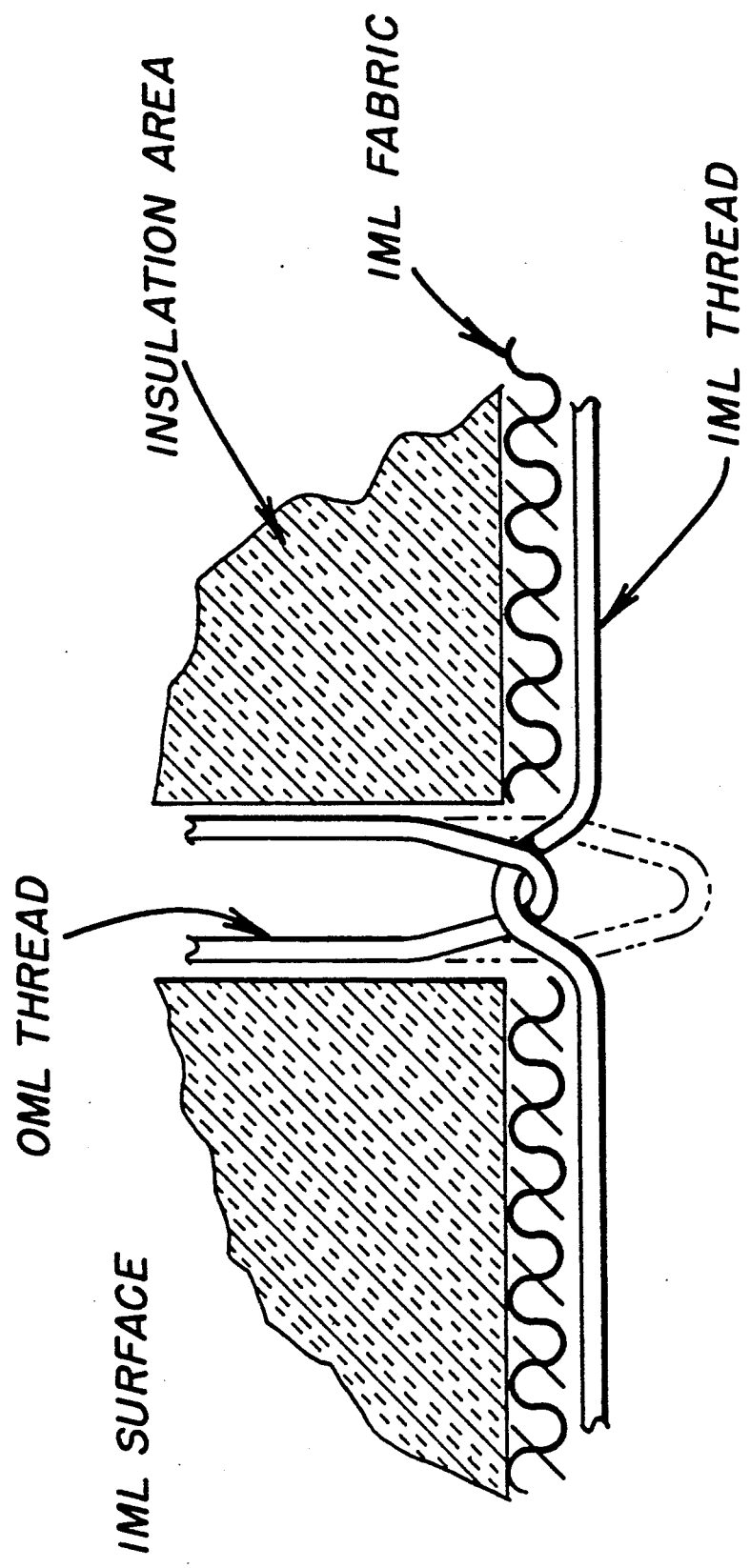
FIG. 21 shows the stitch type used for IML/OML threads in sewing the insulation blanket.

Sewing, stitches, stitch count, stitch pattern stitch type, stitch spacing and closeout stitches conformed to federal standard FED-STD-751. Stitch count was five plus or minus two stitches per inch. Stitch pattern was 2.5 cm by 2.5 cm (FIG. 20, view A—A of FIG. 17) alternating deep stitch (DS), view A-B, with shallow superficial stitch (SSS) using stitch type 301 (FED-STD-751) with exception that the IML/OML thread loop interfacing at the IML fabric side of the blanket was as shown in FIG. 21. In FIG. 21, the end of OML thread loop is shown as it protrudes outside the IML surface during sewing (broken line) and sewn (solid line). In finished sewing, the end of the OML thread loop does not recess into blanket layers deeper than the IML fabric surface.

Stitch spacing was done according to the following dimensions:

| Blanket Orientation | Stitching Pattern |
| --- | --- |
| X-axis, OML | 1 +/− 0.25 inch |
| Y-axis, OML | 1 +/− 0.25 inch |
| X-axis, IML | 2 +/− 0.25 inch |
| Y-axis, IML | 2 +/− 0.25 inch |

Edges of the closeout stitches were terminated at the end of the stitch line by cutting and tying the OML thread to the IML thread on the IML side of the blanket.

The blanket has the following dimensions: The completed blanket thickness at the stitch lines was 0.68 inch minimum. The completed blanket thickness away from the stitch-lines was 0.89 inch plus or minus 0.08 inch. Platform dimensions was 24"×24". Other sizes, small or larger, can also be made. The completed blanket has not exceeded a pillowing allowance of 0.16 inch on the IML side and 0.16 inch on the OML side. The finished blanket was uniform in quality, clean and free from entrapped materials.

The blanket was made up of the following components looking down from the OML Surface: OML fabric, insulation, IML fabric, foil (aluminized surface up), scrim cloth. Foil and scrim cloth alternated with 10 each foils and scrims, except in the case of CVD aluminum foil where no scrim cloth was used.

Figure 22:
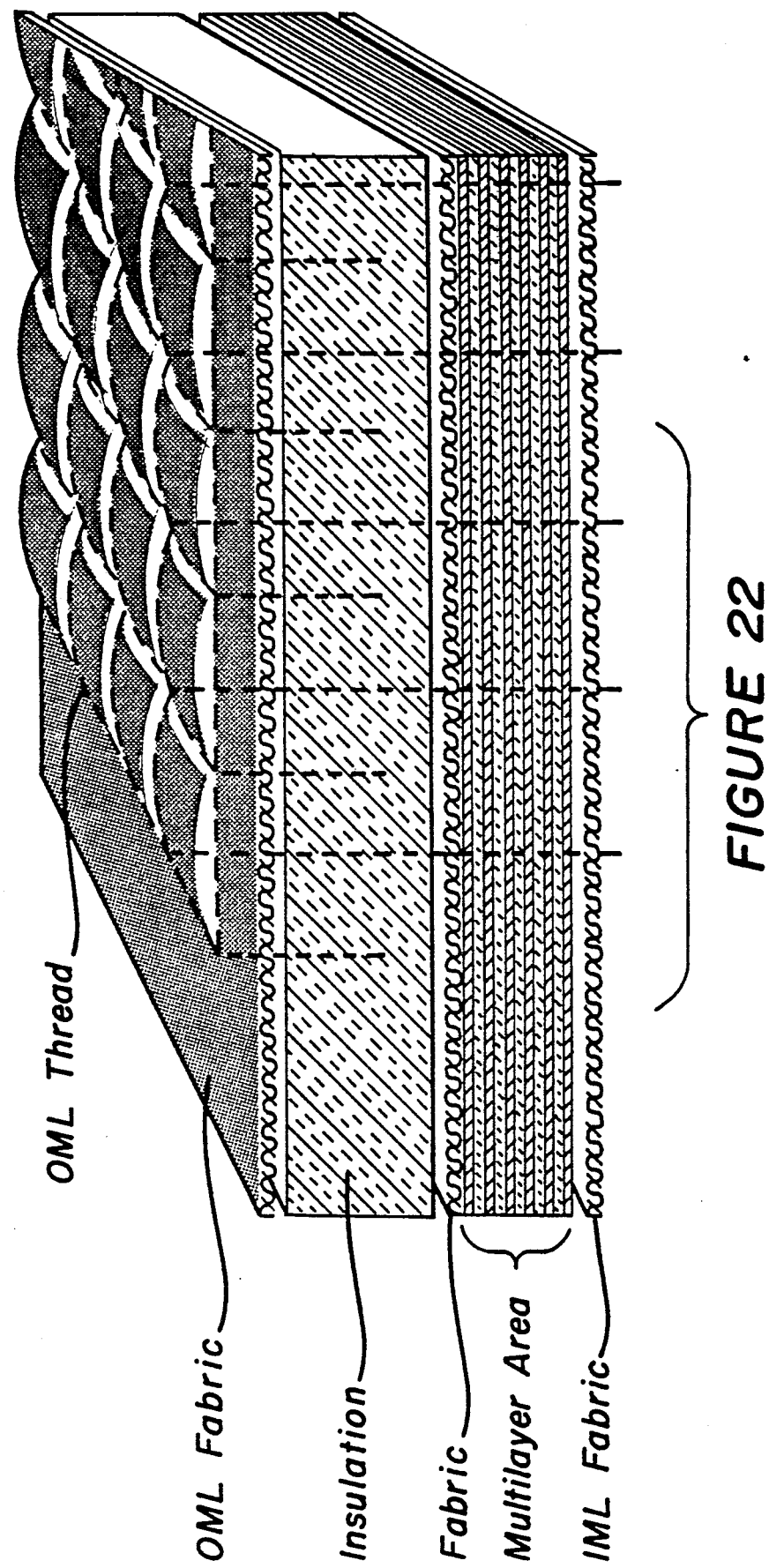
FIG. 22 shows completed quilted insulation blanket configuration.

The blanket was fabricated in two separate operations: (A) The OML fabric, insulation, and IML fabric was used to construct the blanket using a stitch spacing of 2 inches as shown in FIG. 20. OML and IML thread used were silicon carbide and NEXTEL 312, respectively. The multilayer components and a second IML fabric were placed at the bottom of the prefabricated insulation and the entire blanket was resown with a stitch spacing of 2 inches located between the previous OML pattern of 2 inch spacing as shown in FIG. 20. The completed blanket had a 1 inch square pattern on the OML surface and a 2 inch square pattern on the IML surface of the multilayer area as shown in FIGS. 20 and 22.

Fabrication of the insulation blanket was done by quilting of all layers together.

The quilting frame of appropriate size was prepared and one layer of IML fabric was laid over frame and one side was stapled to the wood frame. On each side of frame, cloth was stapled to the frame. Care was taken not to stretch cloth as quilting gathered the cloth and previously stretched material would either rip the cloth or crack the frame. When finished stapling, the cloth should lay flat but not too tight.

The frame was turned over and one layer of insulation was laid and trimmed to size of frame. A reasonable flatness to blanket was maintained throughout quilting.

One layer of OML fabric was stapled on the edge to the wood frame. The insulation blanket may extend above the thickness of the frame, which will cause the OML cloth to pillow. The OML cloth may be pulled tight while stapling the other sides as the pillowing will provide the extra materials needed for quilting.

The OML cloth was then marked with the quilt pattern required.

Quilt stitching starting point in the pattern was optional. Each stitch line added was alternated from side to side from the centerline or starter stitch line. Sewing machine pressure foot was set to maintain blanket thickness of 0.89±0.08 inch.

As many stitches as possible were completed with the blanket in the quilting frame.

The frame was turned over and one layer reflector was laid over the IML cloth. Seams were permissible as long as adjacent reflector seams did not fall in the same plane.

The process was continued with 10 layers of separators and 10 layers of reflectors. A reasonable flatness over the frame area was ensured. Separators were not required for reflective shields CVD aluminum.

Using a template verified to be 24"×24" square, the quilted multilayer blanket were trimmed to required specification, ensuring to secure threads at the edge closeout stitches by cutting and/or typing the OML thread to the IML thread on the IML side of the blanket.

Panel insulation materials were then heat cleaned of sizings and thread servings after fabrication. Cleaning temperature did not exceed 500° C.

Cleanliness was maintained by placing blanket in a clean, plastic bag and sealing with tape.

Rigidity was maintained between two pieces of cardboard. Cardboard was wrapped together to maintain assembly.

Using the procedure described above, the insulation blankets of following configurations were fabricated as summarized in Table 4.

TABLE 4

| Insulation | Components | Thickness (cm) | Component wt, g/sq.m | Summation Weight g/sq.m | Final Thickness cm | Density g/cm$^3$ |
|---|---|---|---|---|---|---|
| 1 | Thread | | 300 | | | |
| | Silicon Carbide | 0.065 | 570 | | | |
| | Q-felt | 2.054 | 1972 | | | |
| | Aluminum foil | 0.00076 | 10 × 20 | 3461 | 2.26 | 0.1531 |
| | Scrim cloth | 0.010 | 9 × 26 | | | |
| | Nextel 312 | 0.043 | 185 | | | |
| 2 | Thread | | 300 | | | |
| | Silicon Carbide | 0.065 | 570 | | | |
| | Ultrafiber | 2.054 | 1972 | | | |
| | Aluminum foil | 0.00076 | 10 × 20 | 3461 | 2.26 | 0.1531 |
| | Scrim cloth | 0.010 | 9 × 26 | | | |
| | Nextel 312 | 0.043 | 185 | | | |
| 3 | Thread | | 300 | | | |
| | Silicon Carbide | 0.055 | 390 | | | |
| | Q-felt | 1.974 | 1895 | | | |
| | Aluminum foil | 0.00076 | 10 × 20 | 3461 | 2.26 | 0.1531 |
| | Scrim cloth | 0.010 | 9 × 26 | | | |
| | Nextel 312 | 0.043 | 185 | | | |
| 4 | Thread | | 300 | | | |
| | Silicon Carbide | 0.065 | 570 | | | |
| | Q-felt | 2.126 | 2041 | 3456 | 2.26 | 0.1529 |
| | Al coated Kapton | 0.0013 | 20 × 18 | | | |
| | Nextel 312 | 0.043 | 185 | | | |
| 5 | Thread | | 300 | | | |
| | Silicon Carbide | 0.065 | 570 | | | |
| | Ultrafiber | 2.126 | 2041 | 3456 | 2.26 | 0.1529 |
| | Al coated Kapton | 0.0013 | 20 × 18 | | | |
| | Nextel 312 | 0.043 | 185 | | | |
| 6 | Thread | | 300 | | | |
| | Silicon Carbide | 0.036 | 285 | | | |
| | Q-felt | 2.040 | 1958 | | | |
| | Nextel 312 | 0.043 | 185 | 3329 | 2.26 | 0.1473 |
| | Al coated Kapton | 0.00076 | 10 × 11 | | | |
| | Scrim cloth | 0.010 | 9 × 34 | | | |
| | Nextel 312 | 0.043 | 185 | | | |
| 7 | Thread | | 300 | | | |
| | Silicon Carbide | 0.036 | 285 | | | |
| | Q-felt | 2.040 | 1958 | | | |
| | Nextel 312 | 0.043 | 185 | 3329 | 2.26 | 0.1473 |
| | Al/Kapton/Al | 0.00076 | 10 × 11 | | | |
| | Scrim cloth | 0.010 | 9 × 34 | | | |
| | Nextel 312 | 0.043 | 185 | | | |
| 8 | Thread | | 300 | | | |
| | Silicon Carbide | 0.036 | 285 | | | |
| | Q-felt | 2.130 | 2045 | | | |
| | Nextel 312 | 0.043 | 185 | 3340 | 2.26 | 0.1473 |
| | Al/Kapton/Scrim | 0.00076 | 10 × 34 | | | |

TABLE 4-continued

| Insulation | Components | Thickness (cm) | Component wt, g/sq.m | Summation Weight g/sq.m | Final Thickness cm | Density g/cm³ |
| --- | --- | --- | --- | --- | --- | --- |
| | Nextel 312 | 0.043 | 185 | | | |

EXAMPLE 4

Thermal Conductivity

The thermal conductivity was determined using a Dynatech Model TCFGM-N18 "Guarded Hot Plate" instrument in accordance with ASTM C-177-85 "Steady-State Thermal Transmission Properties by Means of the Guarded Hot Plate."

Each blanket configuration tested required two homogeneous specimens 8 inches in diameter and of uniform thickness and density. Two specimens were required for each test run as the calculated value of apparent thermal conductivity was based on the average of thermal conductivities for the "heat flow up" and the "heat flow down" directions in the horizontal guarded hot plate apparatus. Configurations No. 3-9 were tested at 23° C., 200° C., 300° C., 400° C., and 500° C. at 0.01 atm, 0.1 atm and 1 atm pressures of air. Samples were tested with the OML surface (top surface) on the heated side. Data collected for each specimen included specimen thickness and density, test temperature, test pressure, apparent thermal conductivity, thermal resistance, and specimen condition after test. Typical results obtained from a CFBI of the following description are shown in Table 5. Composite Flexible Blanket Insulation (CFBI) OML-top layer—Silicon Carbide 8 harness Satin, 380 g/m², Q-Felt Insulation, 10 alternating layers of 0.0003 in. Aluminum foil, type 11450, Brite 1/S, with scrim cloth, Astroquartz, style 886, 300 2/0 Quartz 9779, 20×20 thread count/inch; Bottom layer class cloth, S plain, 6 oz. No. 85392 w/9383 tan finish. Density 9.417 lb/ft³, thickness 1.0 in.

TABLE 5

| Apparent Thermal Conductivity | | | Thermal Resistance | |
| --- | --- | --- | --- | --- |
| Temperature | | | | @0.01 ATM |
| C | F | W/mK | BTU in/hr ft² F | hr ft² F/BTU |
| @0.01 ATM | | | | |
| 23 | 73 | 0.023 | 0.159 | 6.27 |
| 200 | 392 | 0.031 | 0.215 | 4.65 |
| 400 | 752 | 0.049 | 0.340 | 2.94 |
| 600 | 1112 | 0.077 | 0.534 | 1.87 |
| @0.1 ATM | | | | |
| 23 | 73 | 0.034 | 0.236 | 4.24 |
| 200 | 392 | 0.045 | 0.312 | 3.21 |
| 400 | 752 | 0.068 | 0.471 | 2.12 |
| 600 | 1112 | 0.099 | 0.686 | 1.46 |
| @1.0 ATM | | | | |
| 23 | 73 | 0.045 | 0.312 | 3.21 |
| 200 | 392 | 0.063 | 0.437 | 2.29 |
| 400 | 752 | 0.093 | 0.645 | 1.55 |
| 600 | 1112 | 0.133 | 0.922 | 1.08 |

While only a few embodiments of the invention have been shown and described herein, it will become apparent to those skilled in the art that various modifications and changes can be made in the lightweight composite flexible blanket insulation and the method of producing the insulation described herein without departing from the spirit and scope of the present invention. There is every reason to believe that the weight and insulation efficiencies cited herein can be improved upon with minor material modifications. All such modifications and changes coming within the scope of the appended claims are intended to be carried out thereby.

We claim:

1. A composite multilayered flexible blanket insulation comprising top and bottom fabric layers, insulation layers, reflective radiation shield layers and spacers all secured using a ceramic thread, wherein said blanket insulation is able to withstand a heat flux up to 34 BTU/ft²-sec.

2. The blanket insulation of claim 1 wherein the top and bottom fabric chosen from the group consisting of silica, aluminoborosilicate, silicon carbide and a fabric derived from organometallic polymers comprising a composition of silicon, titanium, carbon and oxygen.

3. The blanket insulation of claim 2 wherein the spacer between the reflective shields is chosen from the group consisting of aluminoborosilicate scrim cloth, silica scrim cloth, silica felt, aluminoborosilicate felt, polyimide film, poly(vinyl fluoride) film, or poly(etheretherketone) film.

4. The blanket insulation of claim 3 wherein the reflective shield comprises aluminum foil or vacuum deposited aluminum or gold on polyimide film.

5. The blanket insulation of claim 4 wherein the insulation layer comprises silica felt, silica mat, aluminoborosilicate mat, aluminoborosilicate felt or alumina felt.

6. The blanket insulation of claim 5 wherein the blanket thickness is between about 0.5 and 4 cm.

7. The blanket insulation of claim 6 wherein there are between nine and thirty insulation layers.

8. The blanket insulation of claim 7 wherein the thermal insulation hot surface temperature limit is above 900° C. and between 900° C. and 2000° C.

9. The blanket insulation of claim 1 area density is between about 0.10 and 0.25 g/cm².

10. The blanket insulation of claim 9 wherein the ceramic thread is selected from silica, aluminoboro-silicate, zirconia fiber, continuous inorganic fiber derived from organometallic polymer, silicon nitride, and silicon carbide.

11. The blanket insulation of claim 10 wherein the ceramic thread is silicon carbide.

* * * * *